(12) United States Patent
Tian

(10) Patent No.: US 12,452,353 B2
(45) Date of Patent: Oct. 21, 2025

(54) ELECTRONIC DEVICE

(71) Applicant: HONOR DEVICE CO., LTD., Guangdong (CN)

(72) Inventor: Ang Tian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 114 days.

(21) Appl. No.: 17/911,076

(22) PCT Filed: Jan. 19, 2022

(86) PCT No.: PCT/CN2022/072773
§ 371 (c)(1),
(2) Date: Sep. 12, 2022

(87) PCT Pub. No.: WO2023/284279
PCT Pub. Date: Jan. 19, 2023

(65) Prior Publication Data
US 2024/0205318 A1    Jun. 20, 2024

(30) Foreign Application Priority Data

Jul. 16, 2021  (CN) .......................... 202121625673.8

(51) Int. Cl.
H04M 1/02      (2006.01)
H01M 50/474    (2021.01)
H01M 50/519    (2021.01)
H01M 50/533    (2021.01)
H01M 50/59     (2021.01)

(52) U.S. Cl.
CPC ....... *H04M 1/0277* (2013.01); *H01M 50/474* (2021.01); *H01M 50/519* (2021.01);
(Continued)

(58) Field of Classification Search
CPC .. H04M 1/0277; H04M 1/0262; H04M 1/026; H04M 1/236; H01M 50/474;
(Continued)

(56) References Cited

U.S. PATENT DOCUMENTS 7,606,022 B2 * 10/2009 Kim .................... H01M 50/244
                                                              361/679.01
10,601,066 B2 * 3/2020 Takahashi ......... H01M 10/0436
(Continued)

FOREIGN PATENT DOCUMENTS

CN      107093684 A  *  8/2017  ............ H01M 50/20
CN      107634166 A  *  1/2018  ............. Y02E 60/10
(Continued)

*Primary Examiner* — M Baye Diao
(74) *Attorney, Agent, or Firm* — Fish & Richardson P.C.

(57) ABSTRACT

An electronic device includes a housing, a battery, and an electrical connector. A battery compartment is arranged in the housing. The battery is mounted in the battery compartment. The battery includes a battery body and a wrapping film wrapped around a surface of the battery body. The battery body has a first surface, and the first surface has an expanded region. A distance between an edge of the expanded region and a peripheral edge of the first surface is d. At least part of the electrical connector is located on the first surface, and the part of the electrical connector located on the first surface does not overlap with the wrapping film in the expanded region.

20 Claims, 18 Drawing Sheets

(52) U.S. Cl.
CPC ......... *H01M 50/533* (2021.01); *H01M 50/59* (2021.01); *H04M 1/0262* (2013.01); *H01M 2220/30* (2013.01)

(58) Field of Classification Search
CPC .. H01M 50/519; H01M 50/533; H01M 50/59; H01M 2220/30; H01M 2010/4271; H01M 10/425; H01M 50/202; H01M 50/244; H01M 50/247; H01M 50/271; Y02E 60/10
USPC .......................................................... 320/114
See application file for complete search history.

(56) References Cited

U.S. PATENT DOCUMENTS

| | | | |
|---|---|---|---|
| 10,804,509 B2 * | 10/2020 | Ye | H01M 50/264 |
| 11,296,470 B2 * | 4/2022 | Mizrahi | H01R 13/631 |
| 11,569,540 B2 | 1/2023 | Gao et al. | |
| 2007/0231685 A1 | 10/2007 | Takeuchi et al. | |
| 2019/0006641 A1 | 1/2019 | Ye et al. | |
| 2021/0336238 A1 * | 10/2021 | Chang | H01M 50/296 |

FOREIGN PATENT DOCUMENTS

| | | | | |
|---|---|---|---|---|
| CN | 207116488 U | | 3/2018 | |
| CN | 108485553 A | | 9/2018 | |
| CN | 110364654 A | | 10/2019 | |
| CN | 209929361 U | * | 1/2020 | ............. Y02E 60/10 |
| CN | 211089155 U | | 7/2020 | |
| CN | 211630199 U | | 10/2020 | |
| CN | 211700502 U | | 10/2020 | |
| CN | 109952667 B | | 6/2021 | |
| CN | 213401406 U | | 6/2021 | |
| EP | 3923115 A1 | * | 12/2021 | ............. G06F 1/163 |
| WO | WO-2015182050 A1 | * | 12/2015 | .......... H01M 50/247 |
| WO | WO-2018227423 A1 | * | 12/2018 | .......... H01M 50/211 |
| WO | 2020045499 A1 | | 3/2020 | |

* cited by examiner

ELECTRONIC DEVICE

CROSS-REFERENCE TO RELATED APPLICATIONS

This application is a National Stage of International Application No. PCT/CN2022/072773, filed on Jan. 19, 2022, which claims priority to Chinese Patent Application No. 202121625673.8, filed on Jul. 16, 2021. Both of the aforementioned applications are hereby incorporated by reference in their entireties.

TECHNICAL FIELD

This application relates to the technical field of electronic devices, and in particular, to an electronic device.

BACKGROUND

At present, an electronic device such as a mobile phone, a tablet computer, and a smart wearable device has a battery, and the battery is used to supply power to the electronic device, so as to facilitate the carrying of the electronic device. However, the battery is at risk of expansion after long-term charging and discharging in use. In order to avoid the damage to the whole machine caused by battery expansion, the thickness of the whole electronic device is usually increased to reserve the expansion space of the battery. However, in the related art, due to structural limitations, the thickness of the reserved expansion space is relatively thick, resulting in a larger thickness of the electronic device, which is not conducive to a light and thin design of the electronic device.

SUMMARY

Embodiments of this application provide an electronic device, so as to facilitate reduction in a thickness of the electronic device.

In order to achieve the above purpose, this application provides an electronic device. The electronic device includes: a housing, a battery, and an electrical connector. A battery compartment is arranged in the housing. The battery is mounted in the battery compartment and includes a battery body and a wrapping film wrapped around a surface of the battery body. The battery body has a first surface, the first surface has an expanded region, a distance between an edge of the expanded region and a peripheral edge of the first surface is d, and d≥ 0 mm. At least part of the electrical connector is located on the first surface, and the part of the electrical connector located on the first surface does not overlap with the wrapping film in the expanded region.

In the electronic device provided in the embodiment of this application, since the part of the electrical connector located on the first surface does not overlap with the wrapping film in the expanded region, an overall thickness of the battery and the electrical connector corresponding to a position of the expanded region will not be increased, and a thickness of the expansion space that needs to be reserved is relatively small, which is conducive to reducing the thickness of the electronic device and can achieve a thin electronic device at least to a certain extent.

Optionally, the first surface faces away from a bottom wall of the battery compartment, or the first surface faces the bottom wall of the battery compartment. In an optional implementation provided in this application, a thickness of the battery body is h, and d and h satisfy: $d=(0.5*h+a)$ mm, where a is in a range of [0, 10] mm. Specifically, a is in a range of [0, 3] mm. In this way, the expanded region can be reasonably arranged to ensure that when the battery body is expanded, the position of the maximum thickness of the battery body is located in the expanded region.

In an optional implementation provided in this application, a is in a range of (0, 2] mm. In this way, the expanded region can be reasonably arranged to ensure that when the battery body is expanded, the position of the maximum thickness of the battery body is located in the expanded region.

In an optional implementation provided in this application, the battery body further has a second surface opposite to the first surface and two side surfaces connected between the first surface and the second surface and opposite to each other. The wrapping film includes a first portion, a second portion, and a third portion connected in sequence, the first portion is wrapped around the first surface, the second portion is wrapped around one of the two side surfaces, and the third portion is wrapped around the second surface.

In an optional implementation provided in this application, the wrapping film includes a tearable portion, and the tearable portion is connected to an end of the first portion away from the second portion. In this way, the wrapping film may be used as a tearable film. When the battery is located in the battery compartment and the tearable portion is located on the first surface, the user can easily take out the battery from the battery compartment by pulling the tearable portion, which is convenient for the user to use.

Further, the tearable portion has an avoidance notch configured to give way to the electrical connector. In this way, the wrapping film may be prevented from overlapping with the electrical connector in the expanded region.

In an optional implementation provided in this application, a part of the first portion is wrapped in the expanded region, and a first notch is provided at a part of the first portion corresponding to the electrical connector. In this way, the part of the first portion can be located in the expanded region, which can increase the protection performance and tearing reliability of the battery body. On this basis, the arrangement of the first notch can prevent the wrapping film and the electrical connector from overlapping in the expanded region.

In an optional implementation provided in this application, the first notch extends to an edge of the first portion in a direction from the first portion to the second portion.

In an optional implementation provided in this application, the second portion has formed thereon a first communication notch extending through the second portion in a thickness direction of the second portion, and the first communication notch is in communication with the first notch.

In an optional implementation provided in this application, the wrapping film further includes a fourth portion and a fifth portion. The fourth portion is connected to an end of the third portion away from the second portion, and the fifth portion is connected to an end of the fourth portion away from the third portion. The fourth portion is wrapped around the other of the two side surfaces, and the fifth portion is wrapped around the first surface. This arrangement can increase the wrapping range of the wrapping film, thereby further improving the protection performance of the wrapping film on the battery body.

In an optional implementation provided in this application, a part of the fifth portion is wrapped in the expanded region, and a second notch is provided at a part of the fifth portion corresponding to the electrical connector in the expanded region. In this way, the part of the fifth portion can be located in the expanded region, which can increase the protection performance and tearing reliability of the battery body. On this basis, the arrangement of the second notch can prevent the wrapping film and the electrical connector from overlapping in the expanded region.

In an optional implementation provided in this application, the second notch extends to an edge of the fifth portion in a direction from the fifth portion to the fourth portion.

In an optional implementation provided in this application, the fourth portion has formed thereon a second communication notch extending through the fourth portion in a thickness direction of the fourth portion and in communication with the second notch.

In an optional implementation provided in this application, the battery body further includes a first end surface connected between the two side surfaces, the first end surface has an electrical connection terminal, and the first surface, the second surface, and the two side surfaces are arranged along a circumferential direction of the first end surface.

In an optional implementation provided in this application, the electronic device further includes a main circuit board and a side functional device, where the electrical connector is configured to connect the main circuit board to the side functional device.

In an optional implementation provided in this application, the main circuit board is located on a side of the battery compartment adjacent to the first end surface, and the side functional device faces one of the side surfaces.

In an optional implementation provided in this application, the side functional device is a side button and/or a side fingerprint recognition module.

In an optional implementation provided in this application, the electronic device includes a main circuit board and an auxiliary circuit board. The electrical connector is configured to connect the main circuit board to the auxiliary circuit board.

In an optional implementation provided in this application, the battery body has a second end surface opposite to the first end surface. One of the main circuit board and the auxiliary circuit board is located on the side of the battery compartment adjacent to the first end surface, and the other of the main circuit board and the auxiliary circuit board is located on a side of the battery compartment adjacent to the second end surface.

In an optional implementation provided in this application, the electrical connector is arranged adjacent to one of the side surfaces.

In an optional implementation provided in this application, the electronic device further includes a main circuit board and a display, where the electrical connector bypasses the battery to connect the main circuit board to the display.

In an optional implementation provided in this application, the main circuit board is located on the side of the battery compartment adjacent to the first end surface, and the display is located on a side of the battery facing away from the first surface.

In an optional implementation provided in this application, the electrical connector is a flexible printed circuit board. In this way, the structure is simple and costs are low.

In an optional implementation provided in this application, the electronic device includes a main circuit board and a wireless communication module arranged on the main circuit board. The wireless communication module is configured to send and receive a signal via an antenna, and the electrical connector is a radiator of the antenna.

In an optional implementation provided in this application, the electronic device further includes a separator. The separator is located between the first surface and a surface of the housing opposite to the first surface. A giving-way notch is formed on the part of the wrapping film wrapped around the first surface, and the giving-way notch is configured to give way to the separator.

BRIEF DESCRIPTION OF DRAWINGS

FIG. 4b is a three-dimensional view of a battery body in the battery shown in FIG. 4a:

DESCRIPTION OF EMBODIMENTS

In the embodiments of this application, terms "first", "second", "third", "fourth", and "fifth" are used merely for the purpose of description, and shall not be construed as indicating or implying relative importance or implying a quantity of indicated technical features. Therefore, a feature defined by "first", "second", "third", "fourth", and "fifth" can explicitly or implicitly includes one or more features.

In the embodiments of this application, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

In the embodiments of this application, "and/or" describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

This application provides an electronic device 100. The electronic device 100 is a type of electronic device 100 having a battery 50. Specifically, the electronic device 100 includes, but is not limited to, electronic devices 100 such as a mobile phone, a tablet personal computer (tablet personal computer), a laptop computer (laptop computer), a personal digital assistant (personal digital assistant, PDA), a personal computer, a notebook computer, an onboard device, a wearable device, and the like.

Figure 1:
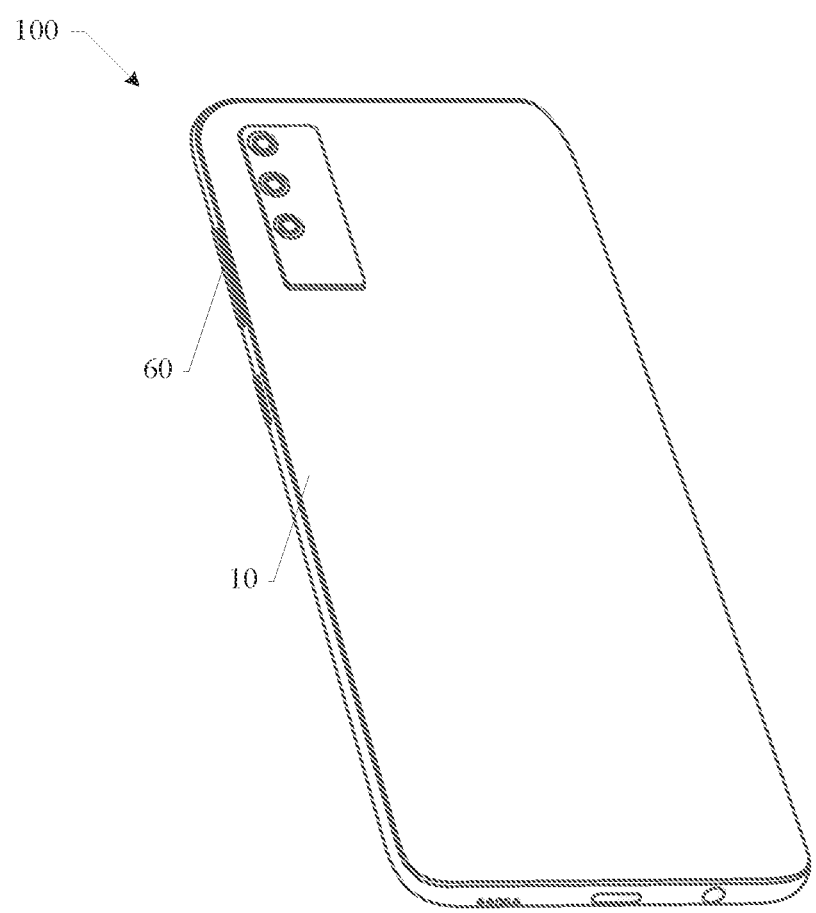
FIG. 1 is a schematic structural diagram of an electronic device according to some embodiments of this application.
Figure 2:
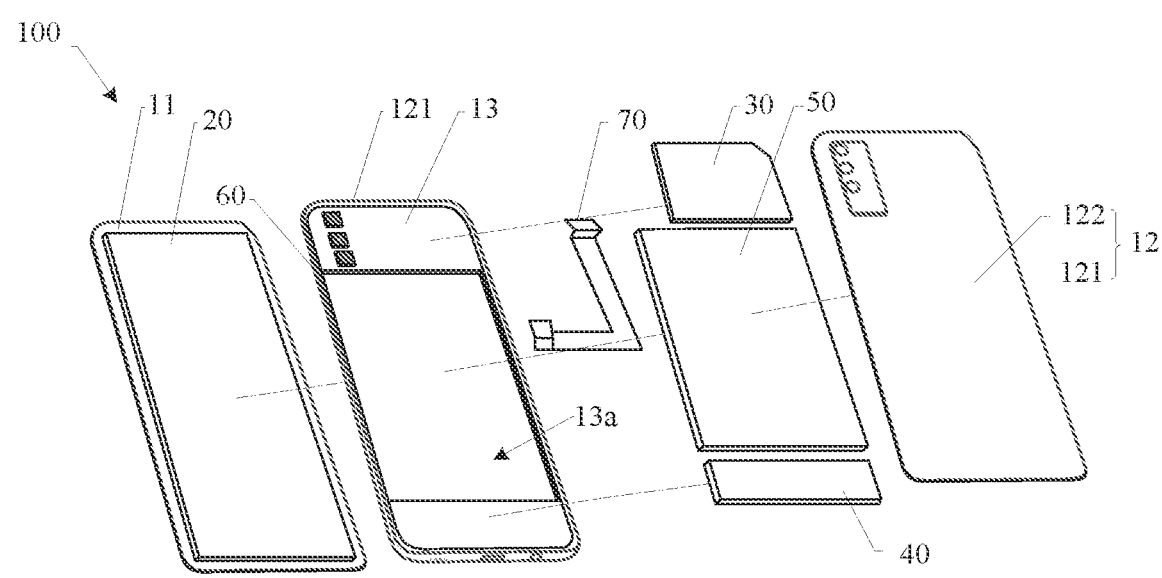
FIG. 2 is an exploded view of the electronic device shown in FIG. 1.

Referring to FIG. 1 and FIG. 2, FIG. 1 is a schematic structural diagram of an electronic device 100 according to some embodiments of this application, and FIG. 2 is an exploded view of the electronic device 100 shown in FIG. 1. In this embodiment, the electronic device 100 is a phablet. Specifically, the electronic device 100 includes a housing 10, a display 20, a side functional device 60, a main circuit board 30, an auxiliary circuit board 40, a battery 50, and an electrical connector 70.

The housing 10 is configured to protect internal circuit elements of the electronic device 100. Still referring to FIG. 2, the housing 10 includes a front cover plate 11 and a back housing 12.

The front cover plate 11 is a light transmissive member, and a material of the front cover plate 11 includes but is not limited to glass, plastic, or ceramic.

The back housing 12 includes a back cover 122 and a border frame 121. The back cover 122 and the front cover plate 11 are stacked and spaced apart from each other. The border frame 121 surrounds a periphery of the front cover plate 11 and is located between the front cover plate 11 and the back cover 122.

Specifically, the border frame 121 is fixed to the back cover 122. For example, the border frame 121 may be fixedly connected to the back cover 122 by gluing, welding, or snapping. The border frame 121 may also be integrally formed with the back cover 122, that is, the border frame 121 and the back cover 122 are an integral structure.

The front cover plate 11 is fixed to the border frame 121. In some embodiments, the front cover plate 11 may be fixed to the border frame 121 by gluing. The front cover plate 11, the back cover 122, and the border frame 121 form an internal accommodating space of the electronic device 100.

The internal accommodating space is configured to accommodate the display 20, at least part of the side functional device 60, the main circuit board 30, the auxiliary circuit board 40, the battery 50, the electrical connector 70, and the like.

The display 20 is located in the housing 10, and the display 20 and the front cover plate 11 are stacked and fixedly connected. The display 20 is configured to display an image, a video, and the like. A flexible display or a rigid display may be used as the display 20. For example, the display 20 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light-emitting diode (quantum dot light emitting diodes, QLED) display, or a liquid crystal display (liquid crystal display, LCD).

The side functional device 60 is located at the border frame 121. The side functional device 60 may be a side fingerprint recognition module and/or a side button. That is to say, the side functional device 60 may be only a side fingerprint recognition module, and may further be only a side button, or may be a side button and a side fingerprint recognition module. The side fingerprint recognition module may be located on one side of the side button close to inside of the housing 10. The side button may be a power button or a volume button, and the side fingerprint recognition module may be an optical fingerprint recognition module, a capacitive fingerprint recognition module, or a radio frequency fingerprint recognition module.

Further, when the side functional device 60 is a side button, or the side functional device 60 is a side button and a side fingerprint recognition module, a mounting hole may be provided on the border frame 121. One end of the side button is located in the housing 10, and an other end of the side button passes through the mounting hole and is exposed from the mounting hole, so as to facilitate user triggering.

When the side functional device 60 is only a side fingerprint recognition module, a mounting hole may be provided on the border frame 121, so that a fingerprint recognition region of the side fingerprint recognition module can be exposed from the mounting hole, so as to facilitate fingerprint collection. Certainly, mounting holes may not be provided, but other structures may be arranged on the border frame 121, for example, a light transmissive fingerprint collection region is arranged, as long as it is ensured that the fingerprint recognition region of the side fingerprint recognition module directly faces the fingerprint collection region on the border frame 121.

In some embodiments, referring to FIG. 2, a middle plate 13 is arranged in the housing 10, and the middle plate 13 is fixed to a periphery of an inner surface of the border frame 121. For example, the middle plate 13 may be fixed to the border frame 121 by welding, gluing, or snapping, or may be integrally formed with the border frame 121. The display 10 is located between the front cover plate 11 and the middle plate 13. At least part of the side functional device 60, the main circuit board 30, the auxiliary circuit board 40, and the battery 50 are located between the middle plate 13 and the back cover 122. The middle plate 13 is used as a structural "skeleton" of the electronic device 100, and the main circuit board 30, the auxiliary circuit board 40, the battery 50, and the like may be fixed to the middle plate 13 by threaded connection, snapping, welding, or the like. When the electronic device 100 does not include the middle plate 13, the main circuit board 30, the auxiliary circuit board 40, the battery 50, and the like may be fixed to a surface of the display 20 toward the back cover 122 by threaded connection, snapping, welding, or the like.

Figure 3:
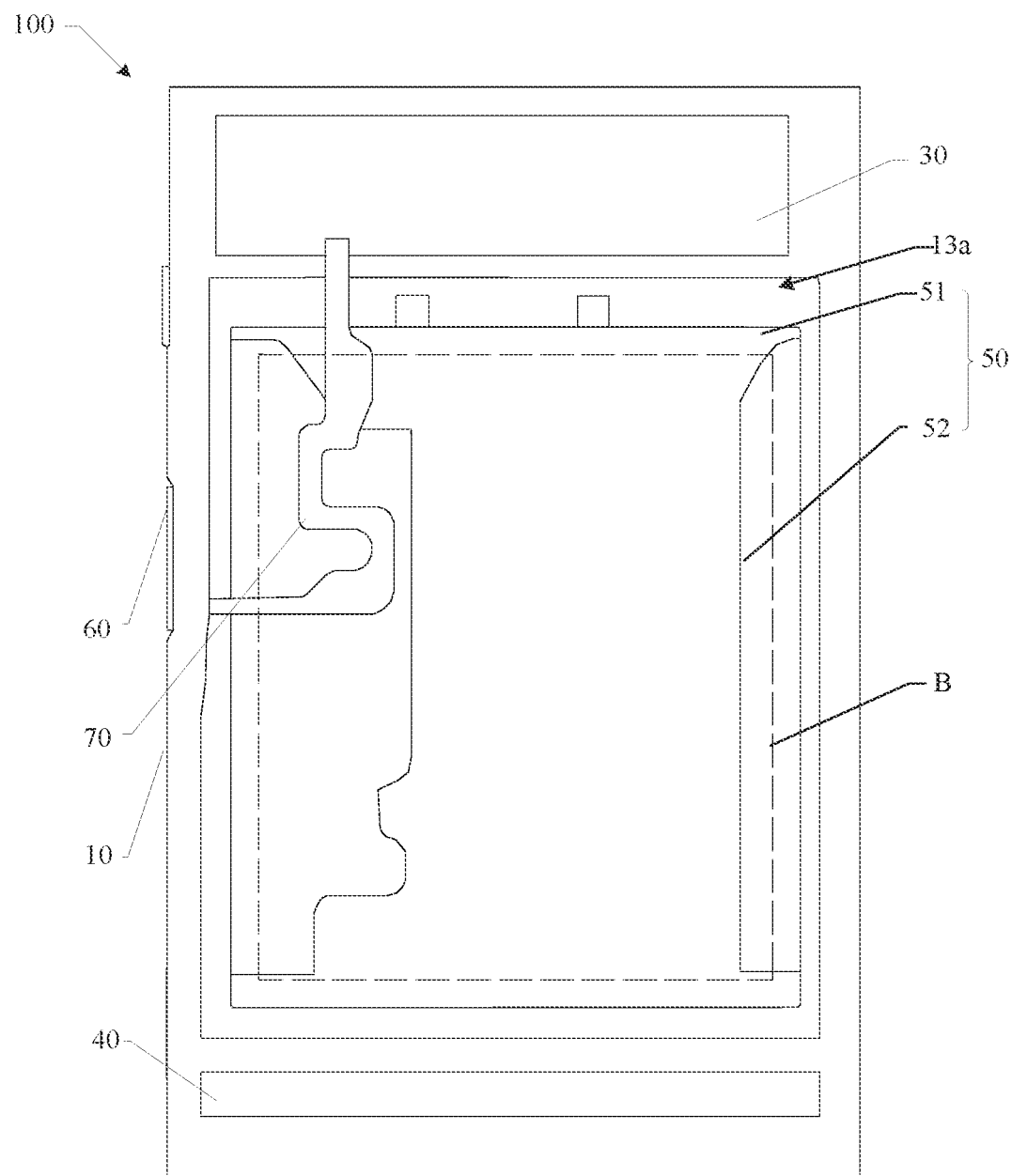
FIG. 3 is a schematic structural diagram of the electronic device shown in FIG. 1 with a back cover being removed.

Referring to FIG. 2 and FIG. 3. FIG. 3 is a schematic structural diagram of the electronic device 100 shown in FIG. 1 with a back cover 122 being removed. The main circuit board 30 is configured to integrate a control chip. The control chip may be, for example, an application processor (application processor. AP), a double data rate (double data rate, DDR) synchronous dynamic random access memory, a universal flash storage (universal flash storage, UFS), and the like. In some embodiments, the main circuit board 30 is electrically connected to both the display 20 and the side functional device 60. The main circuit board 30 is configured to control the display screen 20 to display an image or a video and collect a fingerprint or an instruction inputted from the side functional device 60.

The main circuit board 30 may be a rigid circuit board, a flexible printed circuit board, or a rigid-flex circuit board. The main circuit board 30 may be an FR-4 dielectric board, a Rogers dielectric board, a mixed media board of FR-4 and Rogers, or the like. Herein, FR-4 represents a flame-resistant material grade, and the Rogers dielectric board is a high-frequency board.

The auxiliary circuit board 40 is configured to integrate electronic components such as an antenna (such as a 5G antenna) radio frequency front end, a universal serial bus (universal serial bus. USB) device, an oscillator, and the like. The auxiliary circuit board 40 is electrically connected to the main circuit board 30.

Similarly, the auxiliary circuit board 40 may be a rigid circuit board, a flexible printed circuit board, or a rigid-flex circuit board. The auxiliary circuit board 40 may be an FR-4 dielectric board, a Rogers dielectric board, a mixed media board of FR-4 and Rogers, or the like.

A wireless communication module is integrated on the main circuit board 30 and/or the auxiliary circuit board 40. The wireless communication module may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication. NFC) technology, an infrared (infrared. IR) technology, and the like to be applied to the electronic device 100. The wireless communication module may be one or more devices integrating at least one communication processing module. The wireless communication module receives an electromagnetic wave through an antenna, performs frequency modulation and filtering processing on the electromagnetic wave signal, and sends the processed signal to the control chip. The wireless communication module may further receive a to-be-sent signal from the control chip, perform frequency modulation and amplification on the to-be-sent signal, and convert the signal into an electromagnetic wave through an antenna and radiate the signal. For example, the wireless communication module includes an NFC communication processing module, and an antenna of the NFC communication processing module is an NFC antenna. For another example, the wireless communication module includes a Bluetooth communication processing module, and an antenna of the Bluetooth communication processing module is a Bluetooth antenna. For another example, the wireless communication module includes a wireless local area network communication processing module, and an antenna of the wireless local area network communication processing module is a Wi-Fi antenna.

Still referring to FIG. 2 and FIG. 3, a battery compartment 13a is arranged in the housing 10. The battery compartment 13a is located between the main circuit board 30 and the auxiliary circuit board 40. An opening of the battery compartment 13a faces the back cover 122. In some embodiments, the battery compartment 13a is a groove provided on a surface of the middle plate 13 facing the back cover 122. In some other embodiments, the middle plate 13 forms a bottom wall of the battery compartment, elements such as the main circuit board 30, the auxiliary circuit board 40, a speaker module (not shown in the figure), and the like form two opposite side walls of the battery compartment 13a, and the two sides of the border frame 13 form other two opposite side walls of the battery compartment 13a. In some other embodiments, when the electronic device does not include the middle plate 13, the display screen 20 or the back cover 122 may further form the bottom wall of the battery compartment 13a, and elements such as the main circuit board 30, the auxiliary circuit board 40, the speaker module (not shown in the figure), the border frame 13, and the like form the side wall of the battery compartment 13a.

The battery 50 is mounted in the battery compartment 13a. The battery 50 is configured to supply power to the electrical devices in the electronic device 100 such as the display screen 20, the main circuit board 30, the auxiliary circuit board 40, and the like. The battery 50 includes, but is not limited to, a nickel-cadmium battery, a nickel-metal hydride battery, or a lithium-ion battery.

Figure 4A:
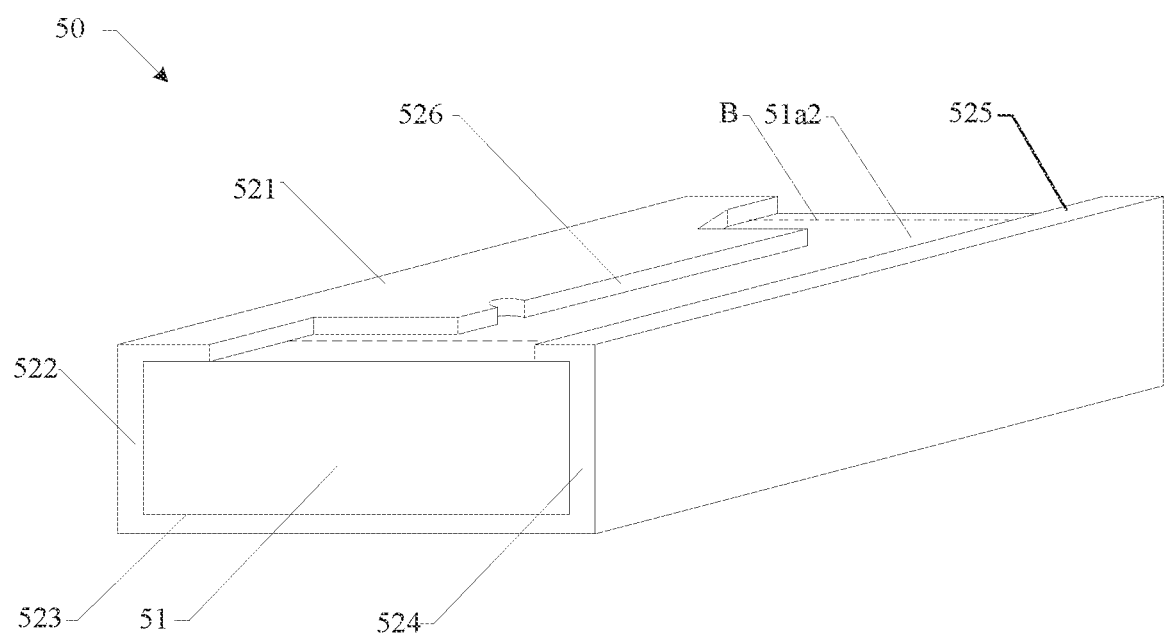
FIG. 4a is a schematic structural diagram of a battery in the electronic device shown in FIG. 2 and FIG. 3.

Referring to FIG. 3 and FIG. 4a, FIG. 4a is a schematic structural diagram of a battery 50 in the electronic device 100 shown in FIG. 2 and FIG. 3. In the embodiment, the battery 50 includes a battery body 51 and a wrapping film 52.

Figure 4B:
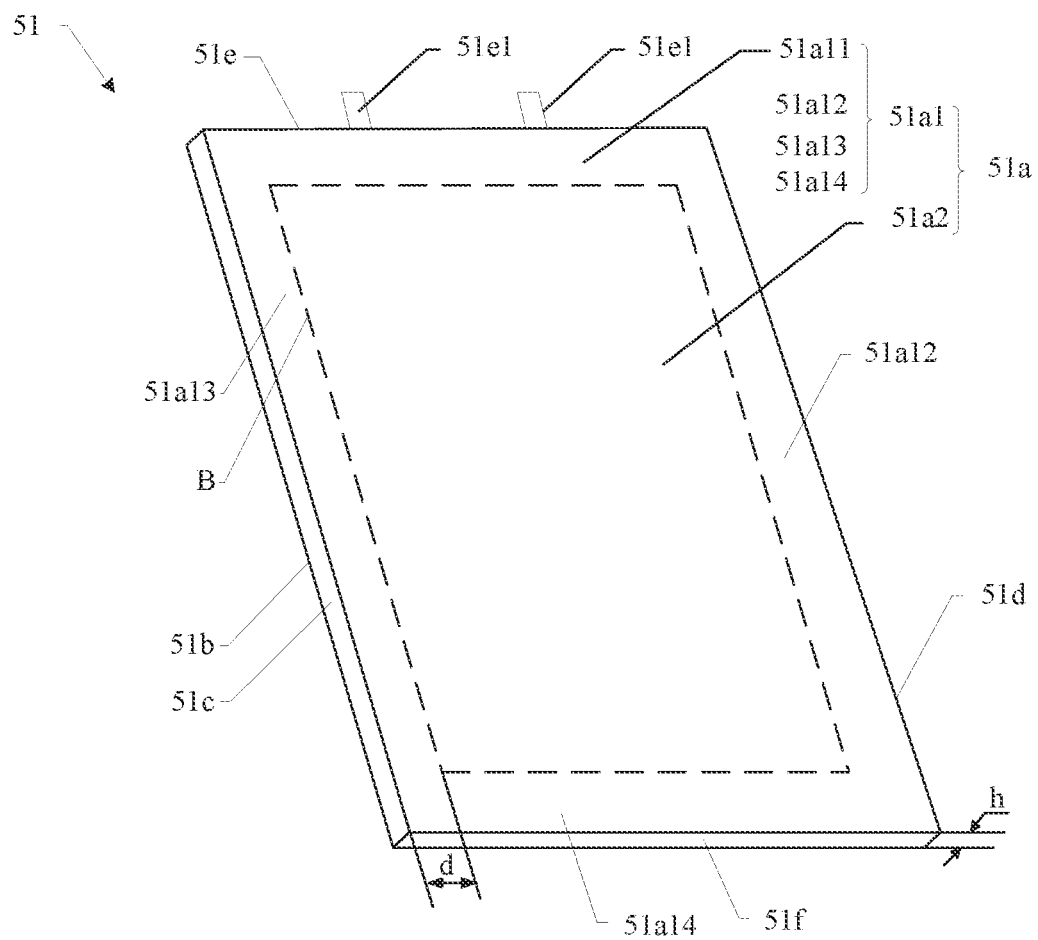
Figure 4C:
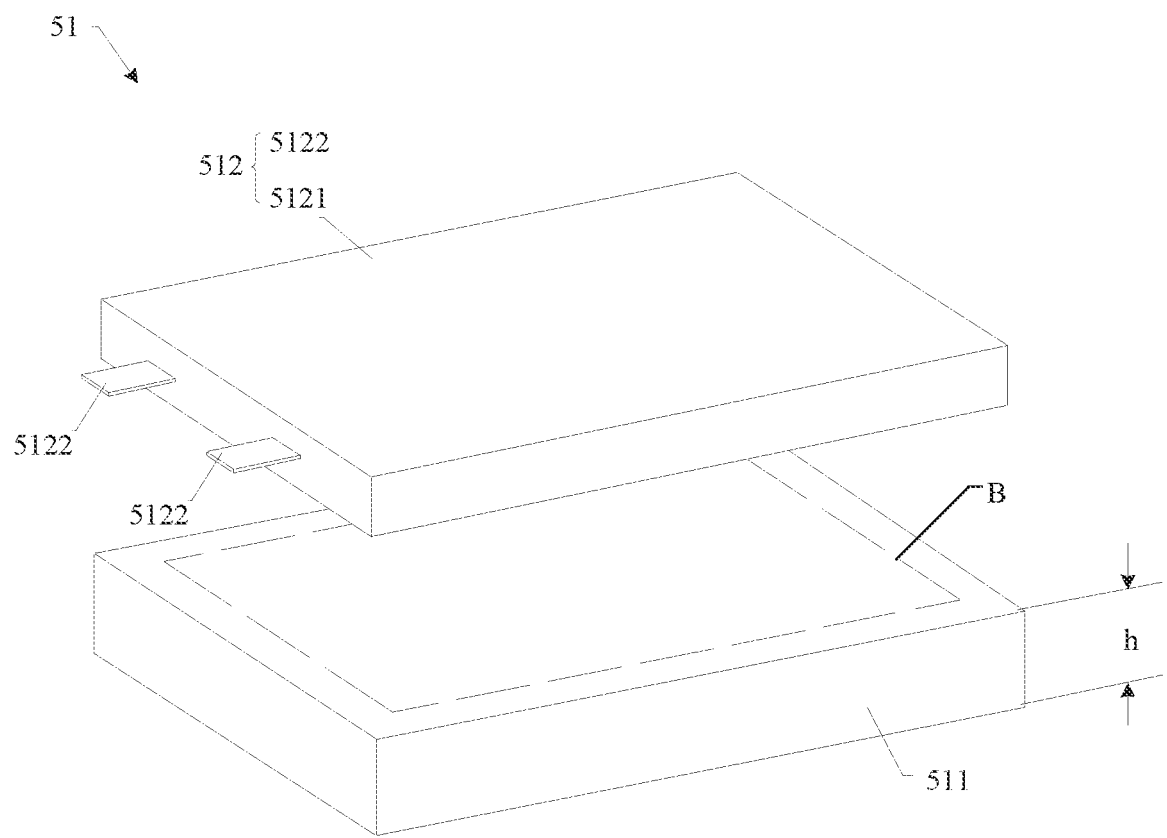
FIG. 4c is an exploded view of the battery body shown in FIG. 4b.

Referring to FIG. 4b and FIG. 4c, FIG. 4b is a three-dimensional view of a battery body 51 in the battery 50 shown in FIG. 4a, and FIG. 4c is an exploded view of the battery body 51 shown in FIG. 4b. In the embodiment, the battery body 51 includes a shell 511, an electrolyte (not shown), and a bare battery core 512.

The shell 511 is configured to encapsulate and protect the bare battery core 512 and the electrolyte, and a shape of the shell 511 includes but is not limited to a cuboid, a cylinder, a frustum of a cone, and the like. A material of the shell 511 includes, but is not limited to, a composite film and a steel shell. Specifically, the composite film includes at least three layers. A middle layer is a metal coating layer configured to isolate moisture. An outer layer is a plastic coating layer configured to prevent the permeation of air, especially oxygen. An inner layer is a sealing layer configured for sealing and preventing the electrolyte from corroding the metal coating layer. A material of the sealing layer is selected from at least one of polyethylene, polypropylene, esters of polyethylene or polypropylene, or ionomers of polyethylene or polypropylene. The polyethylene is selected from low density polyethylene, medium density polyethylene, or high density polyethylene. The polypropylene is selected from homo polypropylene, block polypropylene, or atactic polypropylene. A material of the metal coating layer is selected from at least one of metal, metal alloy, metal oxides, or ceramics, and the metal is selected from aluminum, iron, silver, copper, nickel, manganese, tin, titanium, zirconium, or vanadium. A material of the plastic coating layer is selected from at least one of polyamide resin, polyolefin, polycarbonate, or fluororesin. Further, a material of the shell 511 may be an aluminum plastic film. A middle layer of the aluminum plastic film is an aluminum layer configured to isolate moisture. An outer layer of the aluminum plastic film is made of polyamide, which is configured to prevent the permeation of air, especially oxygen. An inner layer of the aluminum plastic film is a polypropylene layer configured for sealing and preventing the electrolyte from corroding the aluminum layer.

The electrolyte is a carrier for transporting lithium ions in the battery body 51. The electrolyte is generally prepared from raw materials such as high-purity organic solvents, electrolyte lithium salts, necessary additives, and the like in certain proportion under certain conditions.

Still referring to FIG. 4c, the bare battery core 512 includes a bare battery core body 5121 and two tabs 5122. Specifically, the bare battery core body 5121 is located in the shell 511. One end of each tab 5122 is connected to the bare battery core body 5121, and an other end of the tab passes through the shell 511. One of the two tabs 5122 is a positive tab and the other is a negative tab.

Still referring to FIG. 4b, the battery body 51 has a first surface 51a. The first surface 51a is a surface of the battery body 51 facing away from the bottom wall of the battery compartment 13a when the battery 50 is mounted in the electronic device 100 shown in FIG. 1 to FIG. 3. The first surface 51a has an expanded region 51a2 and a non-expanded region 51a1 surrounding a periphery of the expanded region 51a2. As shown in FIG. 4b, a dashed box B divides the first surface 51a into the expanded region 51a2 and the non-expanded region 51a1. The region within the dashed box B is the expanded region 51a2. The region outside the dashed box B is the non-expanded region 51a1. A distance between an edge of the expanded region 51a2 and a peripheral edge of the first surface 51a is d, and d is greater than 0 mm, thereby defining the expanded region. It may be understood that in other examples, d may be 0. When d is 0, the edge of the expanded region 51a2 overlaps with the peripheral edge of the first surface 51a. In this case, the entire first surface 51a is the expanded region 51a2.

In order to define the specific position of the expanded region in the battery body 51, in this embodiment, the thickness of the battery body 51 is h, and d and h satisfy: d=(0.5*h+a) mm. h is the design thickness of the battery body 51, that is, the thickness before expansion. h is greater than 0, and a is greater than or equal to 0. Specifically, a is in a range of [0, 10] mm.

The battery body 51 is at risk of expansion after long-term charging and discharging in use. Specifically, after the battery body 51 is expanded, the position of the maximum thickness of the battery body 51 is required to be located in the expanded region 51a2. In some embodiments, a is in a range of [0, 3] mm. For example, the value of a may be 2.1 mm, 2.2 mm, 2.3 mm, 2.4 mm, 2.5 mm, 2.6 mm, 2.7 mm, 2.8 mm, or 2.9 mm. By limiting a to be in a range of not greater than 3 mm, the expanded region 51a2 and the non-expanded region 51a1 can be reasonably arranged to ensure that when the battery body 51 is expanded, the position of the maximum thickness of the battery body 51 is located in the expanded region 51a2.

In order to further ensure that the position of the maximum thickness of the battery body 51 is located in the expanded region 51a2, a is in a range of (0.2] mm. For example, the value of a may be 0, 0.5 mm. 0.6 mm, 0.7 mm, 0.8 mm. 0.9 mm. 1 mm. 1.2 mm, 1.3 mm, 1.4 mm, 1.5 mm. 1.6 mm. 1.7 mm. 1.8 mm. 1.9 mm, or 2.0 mm.

On this basis, in order to avoid damage to the whole machine caused by the expansion of the battery body 51, a certain height of expansion space is usually reserved on a side in the electronic device 100 that the first surface 51a of the battery body 51 faces. Still referring to FIG. 4b, in addition to the first surface 51a, the battery body 51 further has a second surface 51b, a first end surface 51e, a second end surface 51f, and two side surfaces (that is, a first side surface 51c and a second side surface 51d). The second surface 51b is a surface of the battery body 51 facing the bottom wall of the battery compartment 13a when the battery 50 is mounted in the electronic device 100 shown in FIG. 1 to FIG. 3. The first surface 51a, the second surface 51b, and the two side surfaces are arranged along a circumferential direction of the first end surface 51e.

Specifically, the first surface 51a and the second surface 51b are arranged opposite to each other in a thickness direction of the shell 511, the first end surface 51e and the second end surface 51f are arranged opposite to each other in a length direction of the shell 511, and the two side surfaces are arranged opposite to each other in a width direction of the shell 511. The first side surface 51c, the second surface 51b, the second side surface 51d, and the first surface 51a are arranged in sequence and connected along a circumferential direction of the first end surface 51e.

The first end surface 51e has electrical connection terminals 51e1. In some embodiments, the tabs 5122 in FIG. 4c protrude to outside of the shell 511 after passing through a wallboard of the shell 511 where the first end surface 51e is located, and parts of the tabs 5122 located outside the shell 511 form the electrical connection terminals 51e1. Alternatively, the electrical connection terminals 51e1 are independent of the tabs 5122 shown in FIG. 4c, and the parts of the tabs 5122 located outside the shell 511 are connected to the electrical connection terminals 51e1.

On the basis of the above embodiment, referring to FIG. 4a again, the wrapping film 52 is wrapped and fixed to the surface of the battery body 51 by gluing, or the like. The wrapping film 52 can protect the battery body 51. On this basis, optionally, still referring to FIG. 4a, a part of the wrapping film 52 located on the first surface 51a has a tearable portion 526. The tearable portion 526 and the first surface 51a may not be glued together, or the tearable portion 526 is raised relative to other parts of the wrapping film 52 located on the first surface 51a. In this way, when the battery 50 is located in the battery compartment 13a, the user can easily take out the battery 50 from the battery compartment 13a by pulling the tearable portion 526 to drive the battery 52, so as to facilitate the use of the user.

On the basis of this embodiment, in order to ensure the reliability of taking out the battery 50, optionally, the wrapping film 52 is wrapped around at least the first surface 51a, the second surface 51b, one end surface (such as the first end surface 51e or the second end surface 51f) connected between the first surface 51a and the second surface 51b, or a side surface (such as the first side surface 51c or the second side surface 51d). In the embodiment shown in FIG. 4a, the wrapping film 52 is wrapped around the first surface 51a, the first side surface 51c, the second surface 51b, and the second side surface 51d.

Specifically, the wrapping film 52 includes the tearable portion 526, a first portion 521, a second portion 522, a third portion 523, a fourth portion 524, and a fifth portion 525. The first portion 521, the second portion 522, the third portion 523, the fourth portion 524, and the fifth portion 525 are connected successively in the circumferential direction of the first end surface 51e. The first portion 521 is wrapped around the first surface 51*a*. The tearable portion 526 is connected to an end of the first portion 521 away from the second portion 522. The second portion 522 is wrapped around the first side surface 51*c*. The third portion 523 is wrapped around the second side surface 51*b*. The fourth portion 524 is wrapped around the second side surface 51*d*. The fifth portion 525 is wrapped around the first surface 51*a*.

Figure 5:
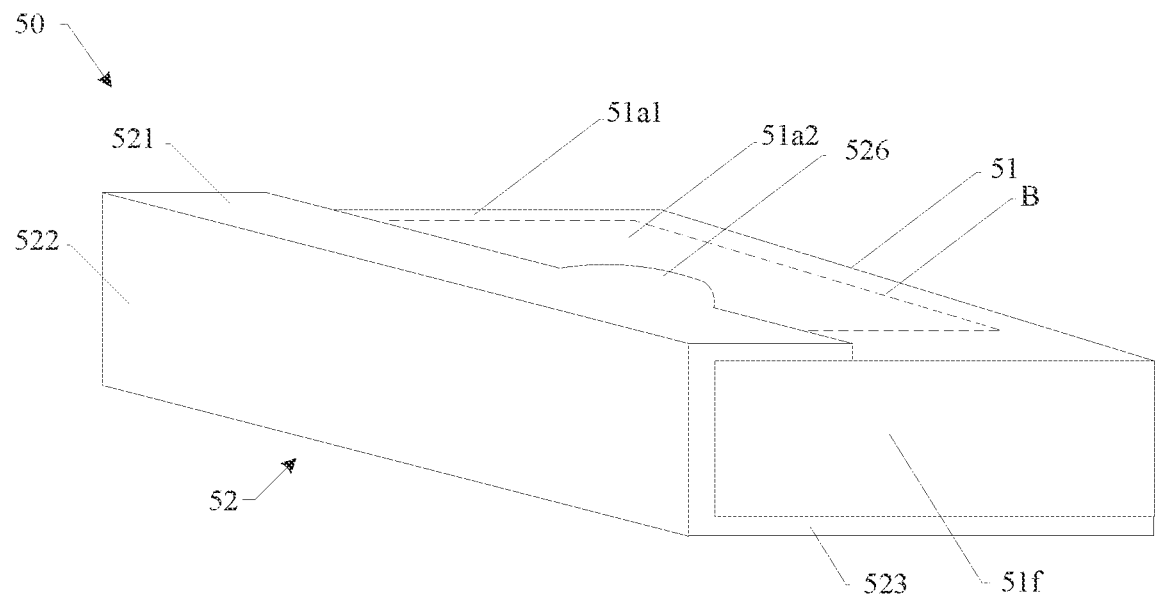
FIG. 5 is a schematic structural diagram of a battery according to some other embodiments of this application.

In some other embodiments, referring to FIG. 5, FIG. 5 is a schematic structural diagram of a battery 50 according to some other embodiments of this application. In the embodiment, the wrapping film 52 includes a tearable portion 526, a first portion 521, a second portion 522, and a third portion 523. The first portion 521, the second portion 522, and the third portion 523 are connected successively in the circumferential direction of the first end surface 51*e*. The first portion 521 is wrapped around the first surface 51*a*, and the tearable portion 526 is connected to an end of the first portion 521 away from the second portion 522. The second portion 522 is wrapped around one of the first side surface 51*c* and the second side surface 51*d*. In the embodiment shown in FIG. 5, the second portion 522 is wrapped around the first side surface 51*c*. The third portion 523 is wrapped around the second surface 51*b*.

Certainly, it may be understood that the wrapping film 52 may further include the first portion 521, the second portion 522, the third portion 523, and the fourth portion 524.

In combination with the wrapping film 52 described in any one of the above embodiments, in order to ensure the protective performance and/or tearing performance of the wrapping film 52, a part of the wrapping film 52 is inevitably wrapped and fixed to the expanded region 51*a*2 of the first surface 51*a*. For example, referring to FIG. 4*a*, a part of the first portion 521 and a part of the fifth portion 525 of the wrapping film 52 are wrapped around the expanded region 51*a*2. For another example, referring to FIG. 5, the part of the first portion 521 of the wrapping film 52 is wrapped around the expanded region 51*a*2.

On the basis of the above embodiments, when the battery 50 shown in FIG. 4*a* or FIG. 5 is applied to the electronic device 100 shown in FIG. 1 to FIG. 3, some electrical connectors inevitably pass through the expanded region 51*a*2 of the first surface 51*a* due to the orientation limitation between the elements connected on two ends. The electrical connector may be an electrical connector configured to electrically connect the main circuit board 30 to the side functional device 60, or may be an electrical connector configured to electrically connect the main circuit board 30 to the display 20, and may further be an electrical connector configured to electrically connect the main circuit board 30 to the auxiliary circuit board 40. The construction form of the electrical connector 70 includes, but is not limited to, a flexible printed circuit board (flexible printed circuit board, FPC) and a structure formed by connecting a plurality of wires through a flexible structure.

One or more electrical connectors 70 may be arranged. In some examples, a plurality of electrical connectors 70 are respectively configured to connect different elements. Optionally, two electrical connectors 70 may be arranged. One of the electrical connectors 70 is configured to connect the main circuit board 30 to the side functional device 60, and the other of the electrical connectors 70 is configured to connect the main circuit board 30 to the auxiliary circuit board 40. Alternatively, one of the electrical connectors 70 is configured to connect the main circuit board 30 to the side functional device 60, and the other of the electrical connectors 70 is configured to connect the main circuit board 30 to the display 20. Alternatively, one of the electrical connectors 70 is configured to connect the main circuit board 30 to the display 20, and the other of the electrical connectors 70 is configured to connect the main circuit board 30 to the auxiliary circuit board 40. Optionally, three electrical connectors 70 may be arranged. One of the electrical connectors 70 is configured to connect the main circuit board 30 to the side functional device 60, another of the electrical connectors 70 is configured to connect the main circuit board 30 to the auxiliary circuit board 40, and the remaining one of the electrical connectors 70 is configured to connect the main circuit board 30 to the display 20. Certainly, it may be understood that the electrical connector 70 is not limited to a connecting structure for realizing a wired electrical connection between two elements. The electrical connector 70 may further be a radiator of an antenna for implementing wireless signal transmission and reception of the wireless communication module described above. For example, the electrical connector 70 is a radiator of the above NFC antenna. For another example, the electrical connector 70 is a radiator of the above Wi-Fi antenna.

Figure 6:
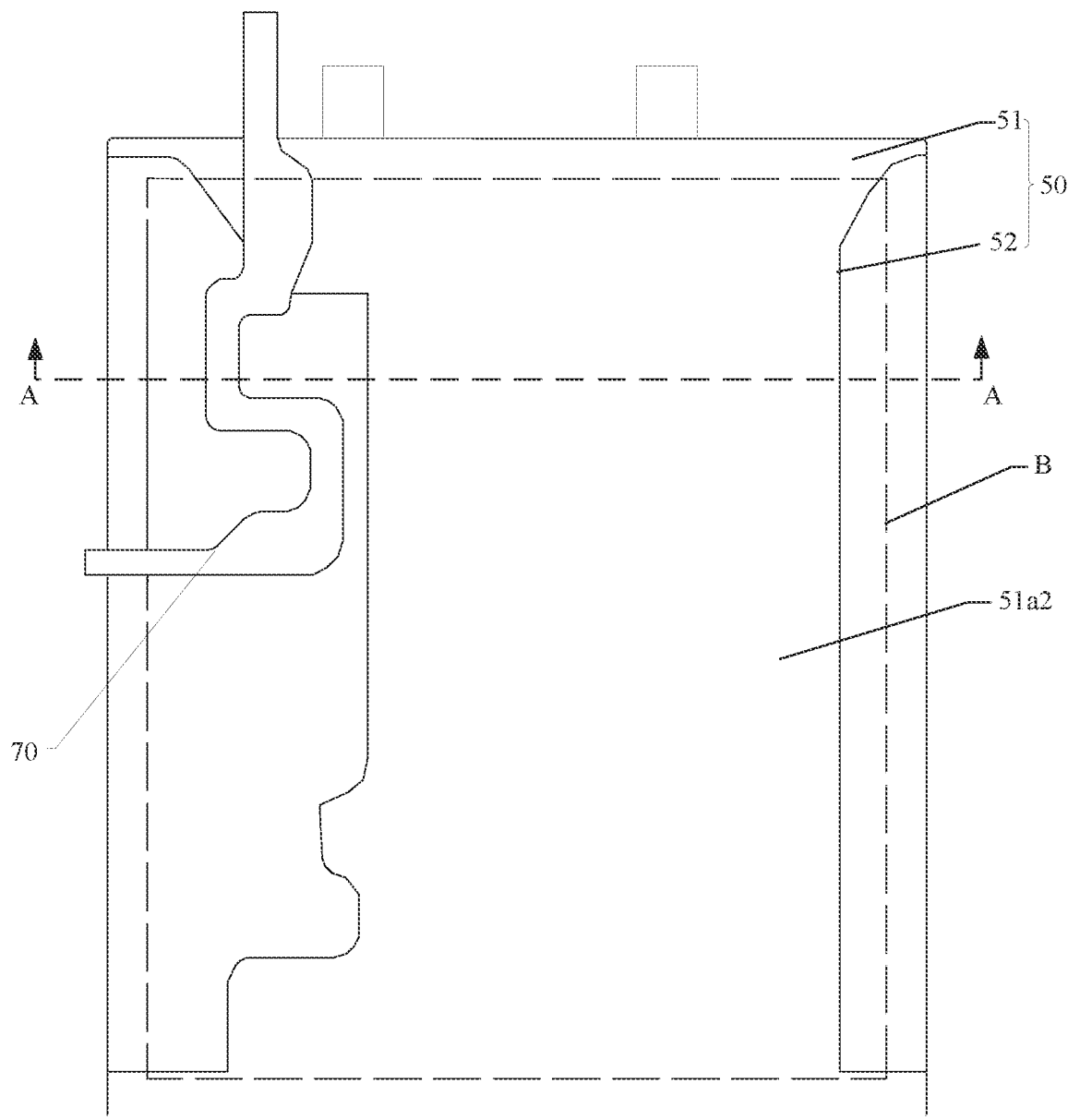
FIG. 6 is a schematic diagram of relative positions of the battery shown in FIG. 4a and an electrical connector configured to electrically connect a main circuit board to a side functional device in the electronic device shown in FIG. 1 to FIG. 3.
Figure 7:
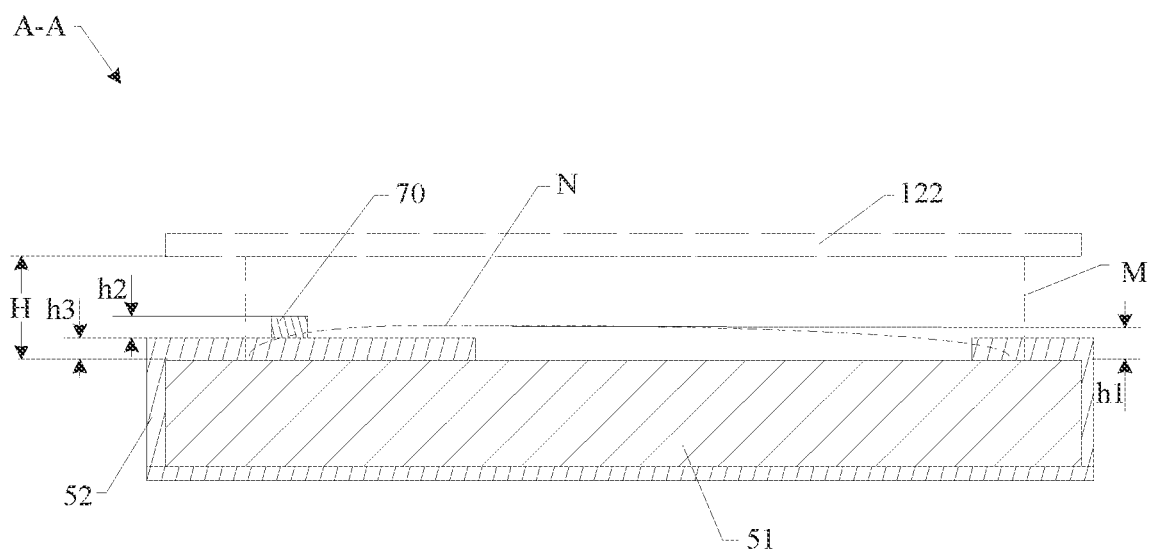
FIG. 7 is a schematic structural cross-sectional view of the structure shown in FIG. 6 taken along line A-A.

In some embodiments, referring to FIG. 6, FIG. 6 is a schematic diagram of relative positions of the battery 50 shown in FIG. 4*a* and an electrical connector 70 configured to electrically connect a main circuit board 30 to a side functional device 60 in the electronic device 100 shown in FIG. 1 to FIG. 3. In this embodiment, the electrical connector 70 passes through the expanded region 51*a*2 of the first surface 51*a*. Referring to FIG. 7, FIG. 7 is a schematic structural cross-sectional view of the structure shown in FIG. 6 taken along line A-A. The part of the electrical connector 70 passing through the expanded region 51*a*2 overlaps with the part of the wrapping film 52 wrapped around the expanded region 51*a*2. A height H of the expansion space that needs to be reserved in the electronic device 100 (a dashed box M in FIG. 7 is the position of the expansion space corresponding to the expanded region 51*a*2) needs to be greater than or equal to a sum of a maximum height h1 of an expanded protrusion (a protruding position of the position indicated by dashed lines N in FIG. 7) of the battery body 51, a thickness h2 of the electrical connector 70, and a thickness h3 of the wrapping film 52, resulting in a relatively large thickness of the reserved expansion space in the electronic device 100 and a relatively large thickness of the electronic device 100, which is not conducive to the thinning of the electronic device 100.

Figure 8:
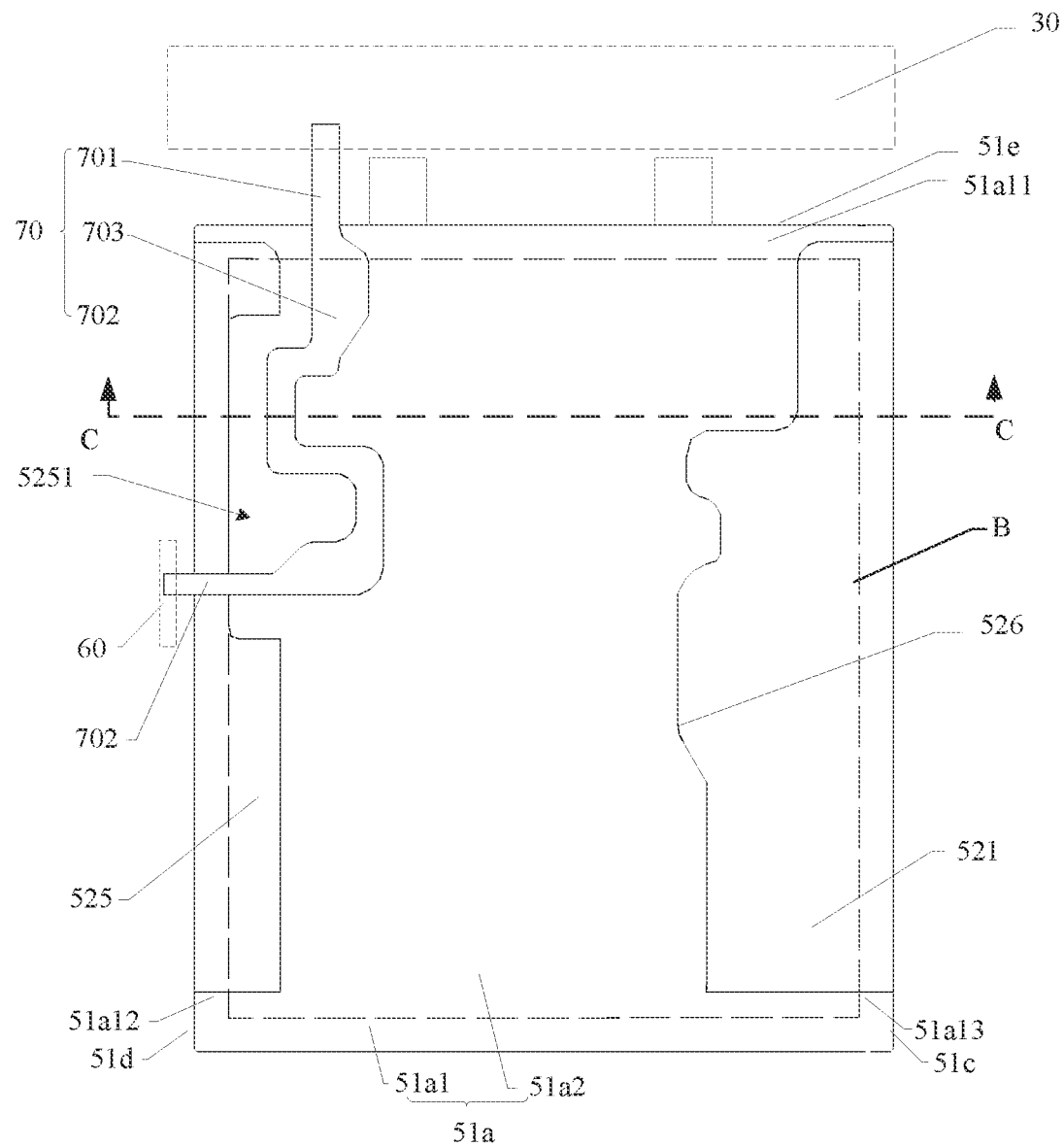
FIG. 8 is another schematic diagram of relative positions of the electrical connector and the battery in the electronic device shown in FIG. 1 to FIG. 3.
Figure 9:
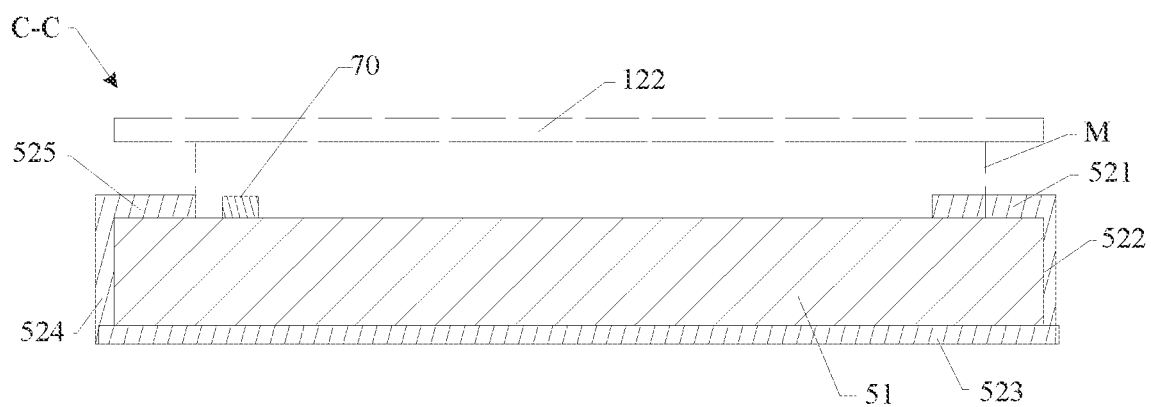
FIG. 9 is a schematic structural cross-sectional view of the structure shown in FIG. 8 taken along line C-C.

In order to solve the technical problem that the thickness of the electronic device 100 is relatively thick, different from the schematic diagram of the relative positions of the electrical connector 70 and the battery 50 shown in FIG. 6 and FIG. 7, referring to FIG. 8 and FIG. 9, FIG. 8 is another schematic diagram of relative positions of the electrical connector 70 and the battery 50 in the electronic device 100 shown in FIG. 1 to FIG. 3, and FIG. 9 is a schematic structural cross-sectional view of the structure shown in FIG. 8 taken along line C-C. In this embodiment, at least part of the electrical connector 70 is located on the first surface 51*a*, and the part of the electrical connector 70 located on the first surface 51*a* does not overlap with the wrapping film 52 in the expanded region 51*a*2. Herein, a part of the wrapping film 52 may be located in the expanded region 51*a*2, or the wrapping film 52 may not be located in the expanded region 51*a*2 at all. A part of the electrical connector 70 may be located in the expanded region 51*a*2, or the electrical connector 70 may not be located in the expanded region 51*a*2 at all, as long as it is ensured that the part of the electrical connector 70 located on the first surface 51*a* does not overlap with the wrapping film 52 in the expanded region 51*a*2.

Herein, the part of the electrical connector 70 located on the first surface 51*a* may be in contact with the first surface 51*a*, or may be spaced apart from the first surface, or may be partly in contact with the first surface and partly spaced apart from the first surface.

In the embodiment of this application, since the part of the electrical connector 70 located on the first surface 51*a* does not overlap with the wrapping film 52 in the expanded region 51*a*2, an overall thickness of the battery and the electrical connector 70 corresponding to a position of the expanded region 51*a*2 will not be increased. Therefore, there is no need to increase the thickness of the expansion space, thereby facilitating reduction in the thickness of the electronic device 100. In this way, a thin electronic device 100 can be achieved at least to a certain extent.

In order to prevent the part of the electrical connector 70 located on the first surface 51*a* and the wrapping film 52 from overlapping in the expanded region 51*a*2, in the embodiments shown in FIG. 8 and FIG. 9, the electrical connector 70 is electrically connected between the main circuit board 30 and the side functional device 60. The main circuit board 30 may be located on a side of the battery compartment 13*a* adjacent to the first end surface 51*e*, and the side functional device 60 directly faces the second side surface 51*d*.

Specifically, still referring to FIG. 8 and FIG. 9, a part of the first surface 51*a* located between the expanded region 51*a*2 and the first end surface 51*e* is a first non-expanded region 51*a*11, and a part of the first surface 51*a* located between the expanded region 51*a*2 and the second side surface 51*d* is a second non-expanded region 51*a*12. The second non-expanded region 51*a*12 is connected to the first non-expanded region 51*a*11. A part of the first surface 51*a* located between the expanded region 51*a*2 and the first side surface 51*c* is a third non-expanded region 51*a*13. The third non-expanded region 51*a*13 is connected to the first non-expanded region 51*a*11.

Still referring to FIG. 8, the electrical connector 70 is arranged adjacent to the second side surface 51*d*. The electrical connector 70 includes a first sub-portion 701, a second sub-portion 702, and a third sub-portion 703. The third sub-portion 703 is completely located in the expanded region 51*a*2. An end of the first sub-portion 701 is connected to the third sub-portion 703, a part of the first sub-portion 701 is located in the first non-expanded region 51*a*11, and an other part of the first sub-portion 701 extends away from the first end surface 51*e* and is connected to the main circuit board 30. The first sub-portion 701 does not overlap with the wrapping film 52 in the first non-expanded region 51*a*11. An end of the second sub-portion 702 is connected to the third sub-portion 703, a part of the second sub-portion 702 is located in the second non-expanded region 51*a*12, and an other part of the second sub-portion 702 extends away from the second side surface 51*d* and is connected to the side functional device 60.

The wrapping film 52 includes a tearable portion 526 and a first portion 521 to a fifth portion 525. The first portion 521 is wrapped around the first surface 51*a*. A part of the first portion 521 is located in the third non-expanded region 51*a*13, and an other part of the first portion is located in the expanded region 51*a*2. The tearable portion 526 is connected to an end of the first portion 521 away from the second portion 522, and the tearable portion 526 is located in the expanded region 51*a*2. The second portion 522 is wrapped around the first side surface 51*c*. The third portion 523 is wrapped around the second surface 51*b*. The fourth portion 524 is wrapped around the second side surface 51*d*. The fifth portion 525 is wrapped around the first surface 51*a*. A part of the fifth portion 525 is located in the second non-expanded region 51*a*12, and an other part of the fifth portion is located in the expanded region 51*a*2.

The second sub-portion 702 overlaps with the fifth portion 525 in the second non-expanded region 51*a*12. However, since the second sub-portion 702 deviates from the expanded region 51*a*2, a position where the second sub-portion 702 and the fifth portion 525 overlap in the second non-expanded region 51*a*12 is not a position having the maximum thickness of the battery 50 after expansion, which will not affect the thin and light design of the electronic device 100. In addition, a wrapping area of the wrapping film 52 can also be increased, and the protective performance of the battery body 51 can be improved.

A second notch 5251 is provided at a position of the fifth portion 525 corresponding to the electrical connector 70. Specifically, the second notch 5251 is located in the expanded region 51*a*2, and the second notch 5251 is configured to give way to the third sub-portion 703 located in the expanded region 51*a*2. Therefore, through the arrangement of the notch, the part of the electrical connector 70 located on the first surface 51*a* does not overlap with the wrapping film 52 in the expanded region 51*a*2.

In the embodiment, the side functional device 60 may be a side fingerprint recognition module and/or a side button. When the side functional device 60 is a side button and a side fingerprint recognition module, the side button and the side fingerprint recognition module may share the electrical connector 70.

Figure 10:
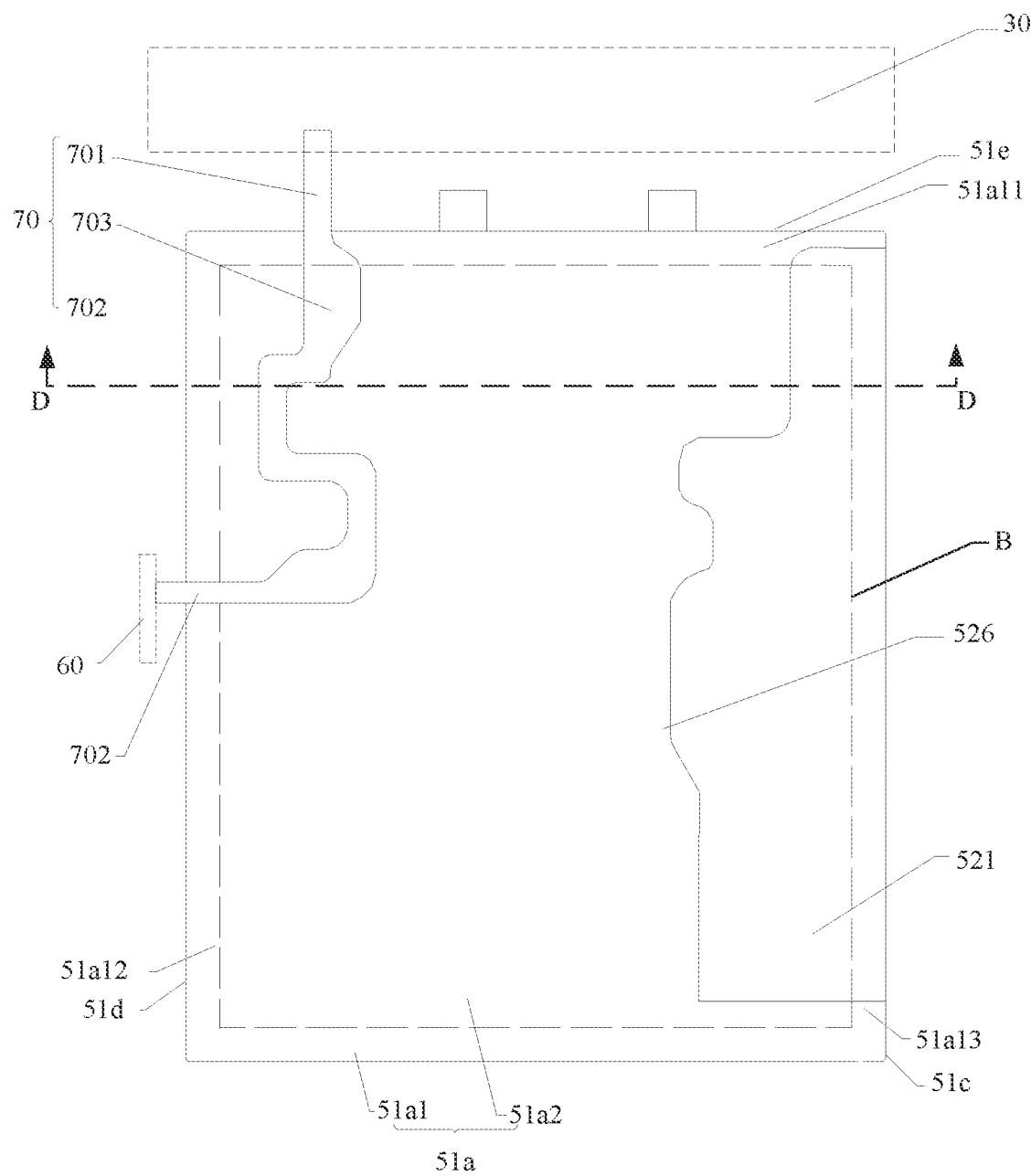
FIG. 10 is still another schematic diagram of relative positions of the electrical connector and the battery in the electronic device shown in FIG. 1 to FIG. 3.
Figure 11:
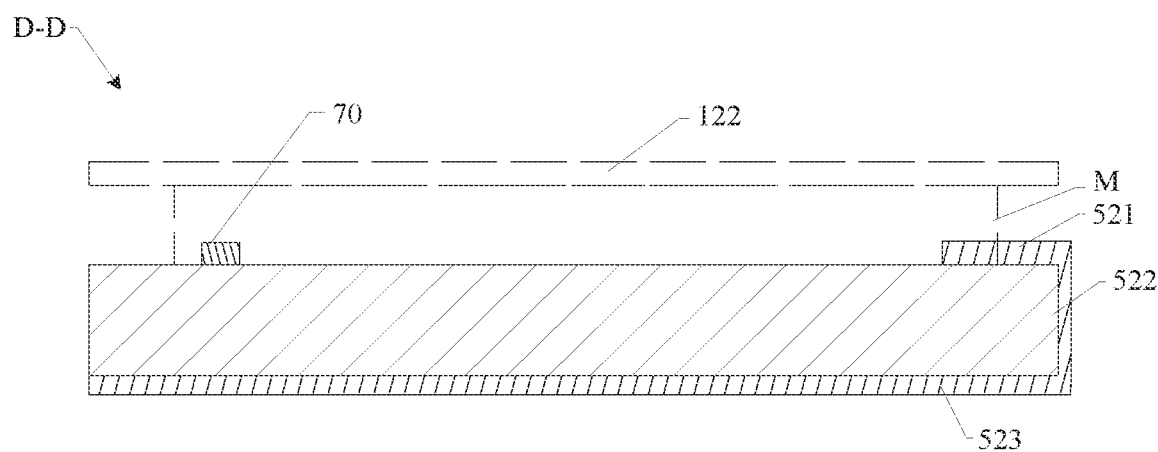
FIG. 11 is a schematic structural cross-sectional view of the structure shown in FIG. 10 taken along line D-D.

In order to prevent the part of the electrical connector 70 located on the first surface 51*a* and the wrapping film 52 from overlapping in the expanded region 51*a*2, in some other embodiments, referring to FIG. 10 and FIG. 11, FIG. 10 is still another schematic diagram of relative positions of the electrical connector 70 and the battery 50 in the electronic device 100 shown in FIG. 1 to FIG. 3, and FIG. 11 is a schematic structural cross-sectional view of the structure shown in FIG. 10 taken along line D-D. In the embodiment, the electrical connector 70 is electrically connected between the main circuit board 30 and the side functional device 60. The main circuit board 30 may be located on the side of the battery compartment 13*a* adjacent to the first end surface 51*e*, and the side functional device 60 directly faces the second side surface 51*d*.

Specifically, still referring to FIG. 10 and FIG. 11, a part of the first surface 51*a* located between the expanded region 51*a*2 and the first end surface 51*e* is a first non-expanded region 51*a*11, and a part of the first surface 51*a* located between the expanded region 51*a*2 and the second side surface 51*d* is a second non-expanded region 51*a*12. The second non-expanded region 51*a*12 is connected to the first non-expanded region 51*a*11. A part of the first surface 51*a* located between the expanded region 51*a*2 and the first side surface 51*c* is a third non-expanded region 51*a*13. The third non-expanded region 51*a*13 is connected to the first non-expanded region 51*a*11.

Still referring to FIG. 10, the electrical connector 70 is arranged adjacent to the second side surface 51*d*. The electrical connector 70 includes a first sub-portion 701, a second sub-portion 702, and a third sub-portion 703. The third sub-portion 703 is completely located in the expanded region 51*a*2. An end of the first sub-portion 701 is connected to the third sub-portion 703, a part of the first sub-portion 701 is located in the first non-expanded region 51a11, and another part of the first sub-portion 701 extends away from the first end surface 51e and is connected to the main circuit board 30. The first sub-portion 701 does not overlap with the wrapping film 52 in the first non-expanded region 51a11. An end of the second sub-portion 702 is connected to the third sub-portion 703, a part of the second sub-portion 702 is located in the second non-expanded region 51a12, and another part of the second sub-portion 702 extends away from the second side surface 51d and is connected to the side functional device 60.

The wrapping film 52 includes a tearable portion 526 and a first portion 521 to a third portion 523. The first portion 521 is wrapped around the first surface 51a. A part of the first portion 521 is located in the third non-expanded region 51a13, and an other part of the first portion is located in the expanded region 51a2. The tearable portion 526 is connected to an end of the first portion 521 away from the second portion 522, and the tearable portion 526 is located in the expanded region 51a2. The second portion 522 is wrapped around the first side surface 51c. The third portion 523 is wrapped around the second surface 51b. In this way, the wrapping film 52 is not arranged in the second non-expanded region 51a12 and the expanded region 51a2 adjacent to the second non-expanded region 51a12, thereby causing the part of the electrical connector 70 located on the first surface 51a not to overlap with the wrapping film 52 on the first surface 51a.

In the embodiment, the side functional device 60 may be a side fingerprint recognition module and/or a side button. When the side functional device 60 is a side button and a side fingerprint recognition module, the side button and the side fingerprint recognition module may share the electrical connector 70.

Figure 12:
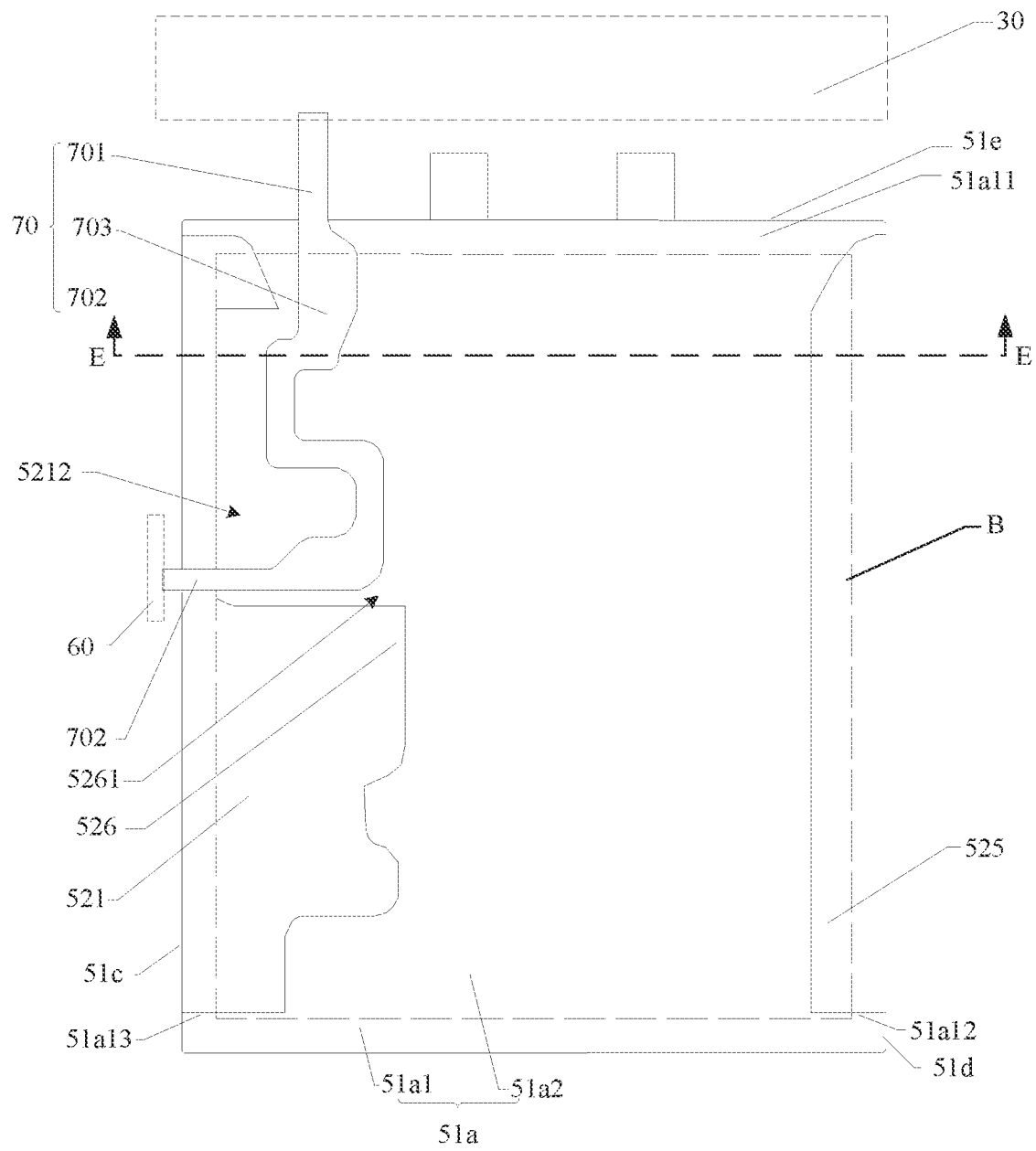
FIG. 12 is yet another schematic diagram of relative positions of the electrical connector and the battery in the electronic device shown in FIG. 1 to FIG. 3.
Figure 13:
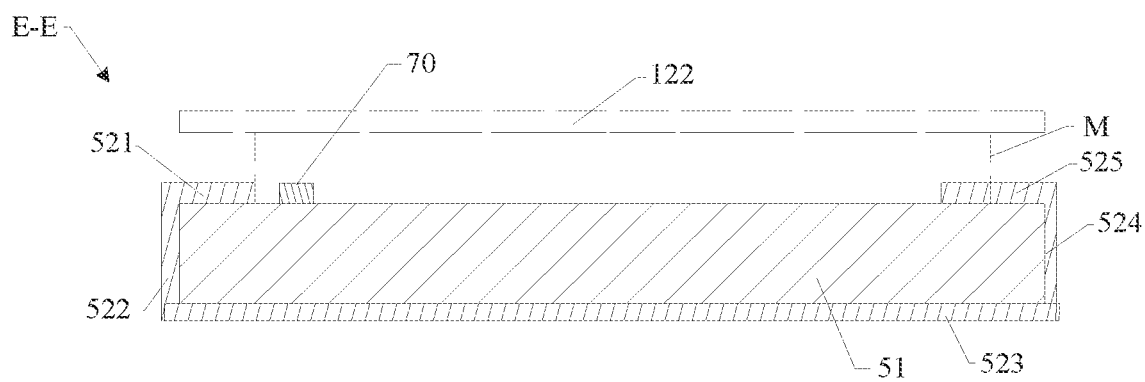
FIG. 13 is a schematic structural cross-sectional view of the structure shown in FIG. 12 taken along line E-E.

In order to prevent the part of the electrical connector 70 located on the first surface 51a and the wrapping film 52 from overlapping in the expanded region 51a2, in some other embodiments, referring to FIG. 12 and FIG. 13. FIG. 12 is yet another schematic diagram of relative positions of the electrical connector 70 and the battery 50 in the electronic device 100 shown in FIG. 1 to FIG. 3, and FIG. 13 is a schematic structural cross-sectional view of the structure shown in FIG. 12 taken along line E-E. In this embodiment, the electrical connector 70 is connected between the main circuit board 30 and the side functional device 60. The main circuit board 30 is located on the side of the battery compartment 13a adjacent to the first end surface 51e, and the side functional device 60 directly faces the first side surface 51c. In this way, the side functional device 60 is arranged at a relatively small distance from the main circuit board 30, which is beneficial to shorten the length of the electrical connector 70.

Specifically, a part of the first surface 51a located between the expanded region 51a2 and the first end surface 51e is a first non-expanded region 51a11, and a part of the first surface 51a located between the expanded region 51a2 and the second side surface 51d is a second non-expanded region 51a12. The second non-expanded region 51a12 is connected to the first non-expanded region 51a11. A part of the first surface 51a located between the expanded region 51a2 and the first side surface 51c is a third non-expanded region 51a13. The third non-expanded region 51a13 is connected to the first non-expanded region 51a11.

Still referring to FIG. 12, the electrical connector 70 is arranged adjacent to the first side surface 51c, and includes a first sub-portion 701, a second sub-portion 702, and a third sub-portion 703. The third sub-portion 703 is completely located in the expanded region 51a2. An end of the first sub-portion 701 is connected to the third sub-portion 703, a part of the first sub-portion 701 is located in the first non-expanded region 51a11, and an other part of the first sub-portion 701 extends away from the first end surface 51e and is connected to the main circuit board 30. The first sub-portion 701 does not overlap with the wrapping film 52 in the first non-expanded region 51a11. An end of the second sub-portion 702 is connected to the third sub-portion 703, a part of the second sub-portion 702 is located in the third non-expanded region 51a13, and an other part of the second sub-portion 702 extends away from the first side surface 51c and is connected to the side functional device 60.

The wrapping film 52 includes a tearable portion 526 and a first portion 521 to a fifth portion 525. The first portion 521 is wrapped around the first surface 51a. A part of the first portion 521 is located in the third non-expanded region 51a13, and an other part of the first portion is located in the expanded region 51a2. The tearable portion 526 is connected to an end of the first portion 521 away from the second portion 522, and the tearable portion 526 is located in the expanded region 51a2. The second portion 522 is wrapped around the first side surface 51c. The third portion 523 is wrapped around the second surface 51b. The fourth portion 524 is wrapped around the second side surface 51d. The fifth portion 525 is wrapped around the first surface 51a. A part of the fifth portion 525 is located in the second non-expanded region 51a12, and an other part of the fifth portion is located in the expanded region 51a2.

The second sub-portion 702 overlaps with the first portion 521 in the third non-expanded region 51a13. However, since the second sub-portion 702 deviates from the expanded region 51a2, a position where the second sub-portion 702 and the first portion 521 overlap in the third non-expanded region 51a13 is not a position having the maximum thickness of the battery 50 after expansion, which will not affect the thin and light design of the electronic device 100.

A first notch 5212 is provided at a position of the first portion 521 corresponding to the electrical connector 70. Specifically, the first notch 5212 is located in the expanded region 51a2, and the first notch 5212 is configured to give way to the third sub-portion 703 located in the expanded region 51a2. Therefore, through the arrangement of the notch, the part of the electrical connector 70 located on the first surface 51a does not overlap with the wrapping film 52 in the expanded region 51a2.

The tearable portion 526 has an avoidance notch 5261. The avoidance notch 5261 is configured to give way to the third sub-portion 703 located in the expanded region 51a2. Therefore, through the arrangement of the avoidance notch 5261, the part of the electrical connector 70 located on the first surface 51a does not overlap with the tearable portion 526 in the expanded region 51a2, so as not to occupy the thickness of the expanded region.

In the embodiment, the side functional device 60 may be a side fingerprint recognition module and/or a side button. When the side functional device 60 is a side button and a side fingerprint recognition module, the side button and the side fingerprint recognition module share the electrical connector 70.

Figure 14:
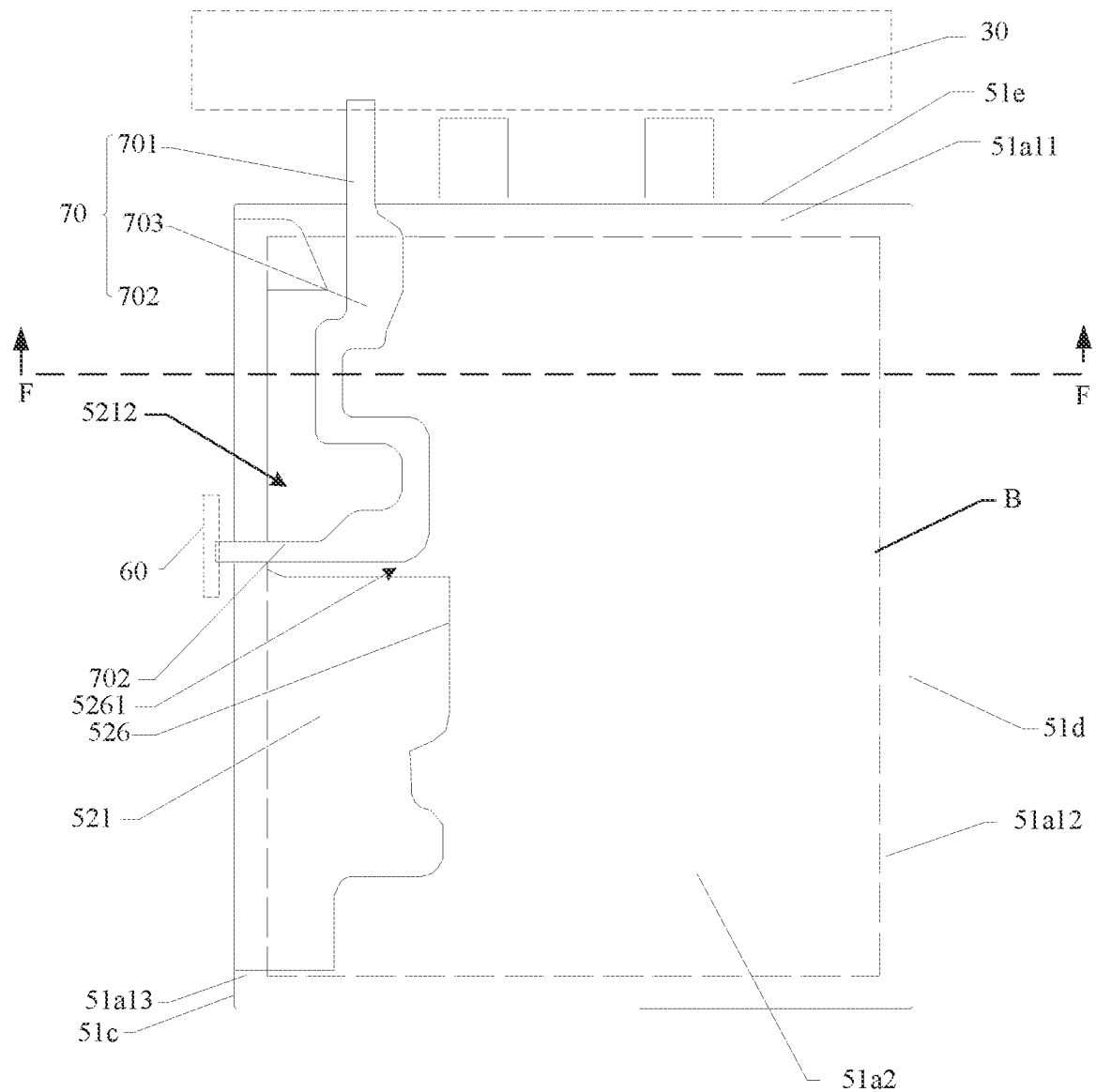
FIG. 14 is another schematic diagram of relative positions of the electrical connector and the battery in the electronic device shown in FIG. 1 to FIG. 3.
Figure 15:
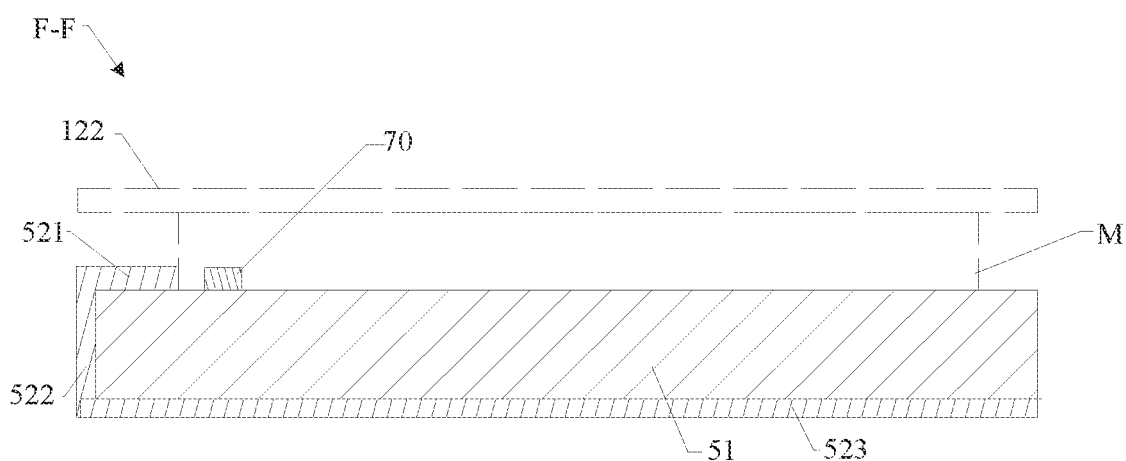
FIG. 15 is a schematic structural cross-sectional view of the structure shown in FIG. 14 taken along line F-F.

In order to prevent the part of the electrical connector 70 located on the first surface 51a and the wrapping film 52 from overlapping in the expanded region 51a2, in some other embodiments, referring to FIG. 14 and FIG. 15, FIG. 14 is another schematic diagram of relative positions of the electrical connector 70 and the battery 50 in the electronic device 100 shown in FIG. 1 to FIG. 3, and FIG. 15 is a schematic structural cross-sectional view of the structure shown in FIG. 14 taken along line F-F. In the embodiment, the electrical connector 70 is connected between the main circuit board 30 and the side functional device 60. The main circuit board 30 is located on the side of the battery compartment 13a adjacent to the first end surface 51e, and the side functional device 60 directly faces the first side surface 51c. In this way, the side functional device 60 is arranged at a relatively small distance from the main circuit board 30, which is beneficial to shorten the length of the electrical connector 70.

Specifically, a part of the first surface 51a located between the expanded region 51a2 and the first end surface 51e is a first non-expanded region 51a11, and a part of the first surface 51a located between the expanded region 51a2 and the second side surface 51d is a second non-expanded region 51a12. The second non-expanded region 51a12 is connected to the first non-expanded region 51a11. A part of the first surface 51a located between the expanded region 51a2 and the first side surface 51c is a third non-expanded region 51a13. The third non-expanded region 51a13 is connected to the first non-expanded region 51a11.

Still referring to FIG. 14, the electrical connector 70 is arranged adjacent to the first side surface 51c, and includes a first sub-portion 701, a second sub-portion 702, and a third sub-portion 703. The third sub-portion 703 is completely located in the expanded region 51a2. An end of the first sub-portion 701 is connected to the third sub-portion 703, a part of the first sub-portion 701 is located in the first non-expanded region 51a11, and an other part of the first sub-portion 701 extends away from the first end surface 51e and is connected to the main circuit board 30. An end of the second sub-portion 702 is connected to the third sub-portion 703, a part of the second sub-portion 702 is located in the third non-expanded region 51a13, and an other part of the second sub-portion 702 extends away from the first side surface 51e and is connected to the side functional device 60.

The wrapping film 52 includes a tearable portion 526 and a first portion 521 to a third portion 523. The first portion 521 is wrapped around the first surface 51a. A part of the first portion 521 is located in the third non-expanded region 51a13, and an other part of the first portion is located in the expanded region 51a2. The tearable portion 526 is connected to an end of the first portion 521 away from the second portion 522, and the tearable portion 526 is located in the expanded region 51a2. The second portion 522 is wrapped around the first side surface 51c. The third portion 523 is wrapped around the second surface 51b.

The second sub-portion 702 overlaps with the first portion 521 in the third non-expanded region 51a13. However, since the second sub-portion 702 deviates from the expanded region 51a2, a position where the second sub-portion 702 and the first portion 521 overlap is not a position having the maximum thickness of the battery 50 after expansion, which will not affect the thin and light design of the electronic device 100.

A first notch 5212 is provided at a position of the first portion 521 corresponding to the electrical connector 70. Specifically, the first notch 5212 is located in the expanded region, and the first notch 5212 is configured to give way to the third sub-portion 703 located in the expanded region 51a2. Therefore, through the arrangement of the notch, the part of the electrical connector 70 located on the first surface 51a does not overlap with the wrapping film 52 in the expanded region 51a2.

The tearable portion 526 has an avoidance notch 5261. The avoidance notch 5261 is configured to give way to the third sub-portion 703 located in the expanded region 51a2. Therefore, through the arrangement of the avoidance notch 5261, the part of the electrical connector 70 located on the first surface 51a does not overlap with the tearable portion 526 in the expanded region 51a2, so as not to occupy the thickness of the expanded region.

In the embodiment, the side functional device 60 may be a side fingerprint recognition module and/or a side button. When the side functional device 60 is a side button and a side fingerprint recognition module, the side button and the side fingerprint recognition module share the electrical connector 70.

Figure 16:
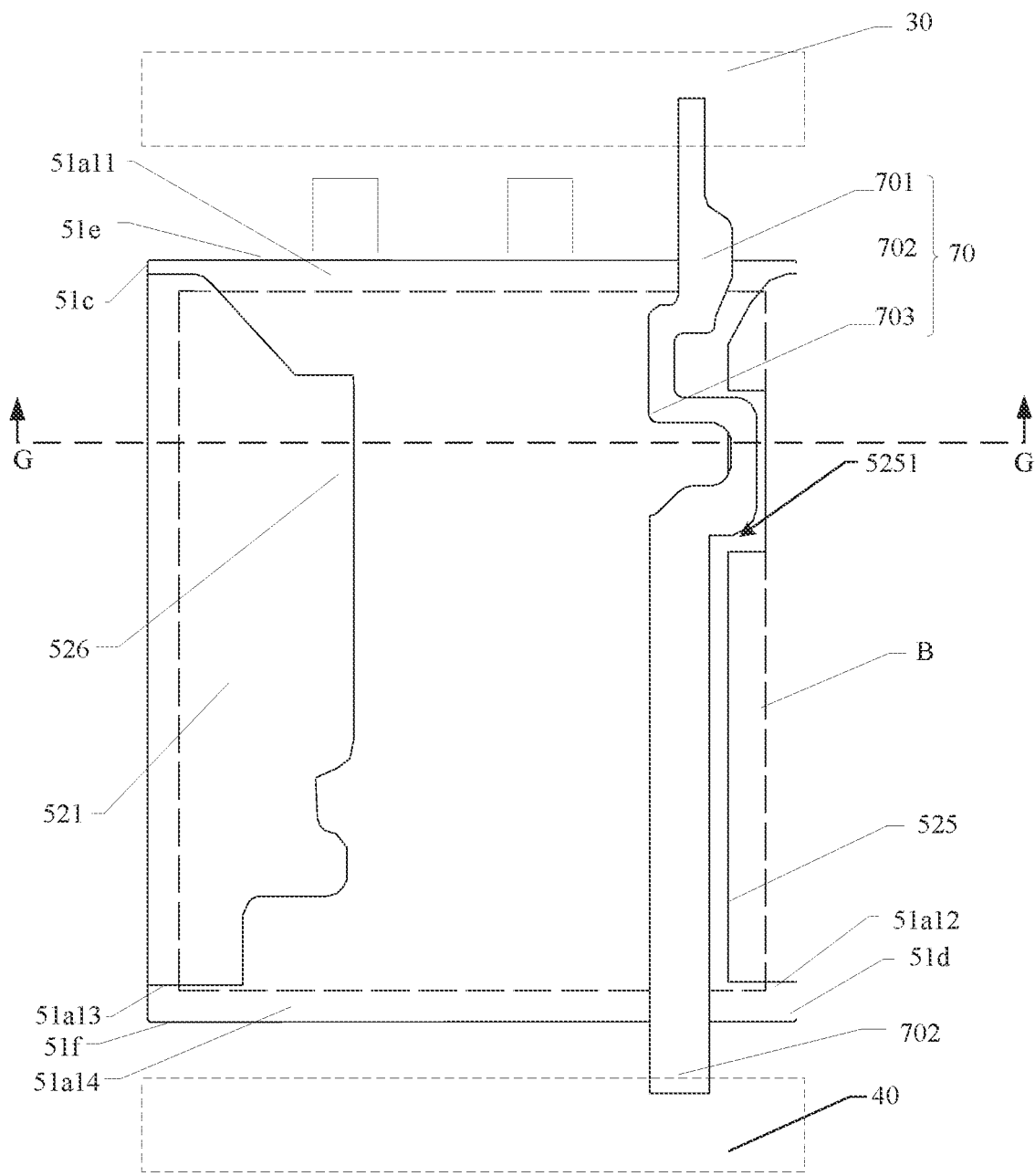
FIG. 16 is another schematic diagram of relative positions of the electrical connector and the battery in the electronic device shown in FIG. 1 to FIG. 3.
Figure 17:
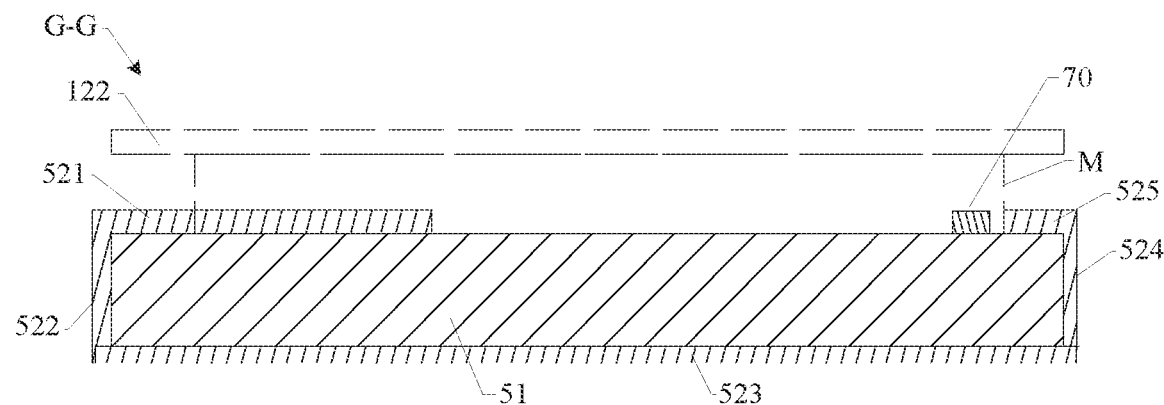
FIG. 17 is a schematic structural cross-sectional view of the structure shown in FIG. 16 taken along line G-G.

In order to prevent the part of the electrical connector 70 located on the first surface 51a and the wrapping film 52 from overlapping in the expanded region 51a2, in some other embodiments, referring to FIG. 16 and FIG. 17, FIG. 16 is another schematic diagram of relative positions of the electrical connector 70 and the battery 50 in the electronic device 100 shown in FIG. 1 to FIG. 3, and FIG. 17 is a schematic structural cross-sectional view of the structure shown in FIG. 16 taken along line G-G. In the embodiment, the electrical connector 70 is connected between the main circuit board 30 and the auxiliary circuit board 40. The main circuit board 30 is located on the side of the battery compartment 13a adjacent to the first end surface 51e, and the auxiliary circuit board 40 is located on a side of the battery compartment 13a adjacent to the second end surface 51f.

Specifically, a part of the first surface 51a located between the expanded region 51a2 and the first end surface 51e is a first non-expanded region 51a11, and a part of the first surface 51a located between the expanded region 51a2 and the second side surface 51d is a second non-expanded region 51a12. The second non-expanded region 51a12 is connected to the first non-expanded region 51a11. A part of the first surface 51a located between the expanded region 51a2 and the first side surface 51c is a third non-expanded region 51a13. The third non-expanded region 51a13 is connected to the first non-expanded region 51a11. A part of the first surface 51a located between the expanded region 51a2 and the second end surface 51f is a fourth non-expanded region 51a14. Two ends of the fourth non-expanded region 51a14 are respectively connected to the second non-expanded region 51a12 and the third non-expanded region 51a13.

The wrapping film 52 includes a tearable portion 526 and a first portion 521 to a fifth portion 525. The first portion 521 is wrapped around the first surface 51a. A part of the first portion 521 is located in the third non-expanded region 51a13, and an other part of the first portion is located in the expanded region 51a2. The part of the first portion 521 located in the expanded region 51a2 is connected to the tearable portion 526, and the second portion 522 is wrapped around the first side surface 51c. The third portion 523 is wrapped around the second surface 51b. The fourth portion 524 is wrapped around the second side surface 51d. The fifth portion 525 is wrapped around the first surface 51a. A part of the fifth portion 525 is located in the second non-expanded region 51a12, and an other part of the fifth portion is located in the expanded region 51a2.

The electrical connector 70 is located between the first portion 521 and the fifth portion 525, and is arranged adjacent to the second side surface 51d. In this way, the electrical connector 70 can be closer to the non-expanded region 51a2, thereby avoiding the center of the expanded region 51a2, and reducing the thickness of the electronic device 100.

The electrical connector 70 includes a first sub-portion 701, a second sub-portion 702, and a third sub-portion 703. The third sub-portion 703 is completely located in the expanded region 51a2. An end of the first sub-portion 701 is connected to the third sub-portion 703, a part of the first sub-portion 701 is located in the first non-expanded region 51a11, and an other part of the first sub-portion 701 extends away from the first end surface 51e and is connected to the main circuit board 30. An end of the second sub-portion 702 is connected to the third sub-portion 703, a part of the second sub-portion 702 is located in the fourth non-expanded region 51a14, and an other part of the second sub-portion 702 extends away from the second end surface 51f and is connected to the auxiliary circuit board 40.

A second notch 5251 is provided at a position of the fifth portion 525 corresponding to the electrical connector 70. Specifically, the second notch 5251 is located in the expanded region 51a2, and the second notch 5251 is configured to give way to the third sub-portion 703 located in the expanded region 51a2. Therefore, through the arrangement of the notch, the part of the electrical connector 70 located on the first surface 51a does not overlap with the wrapping film 52 in the expanded region 51a2.

Figure 18:
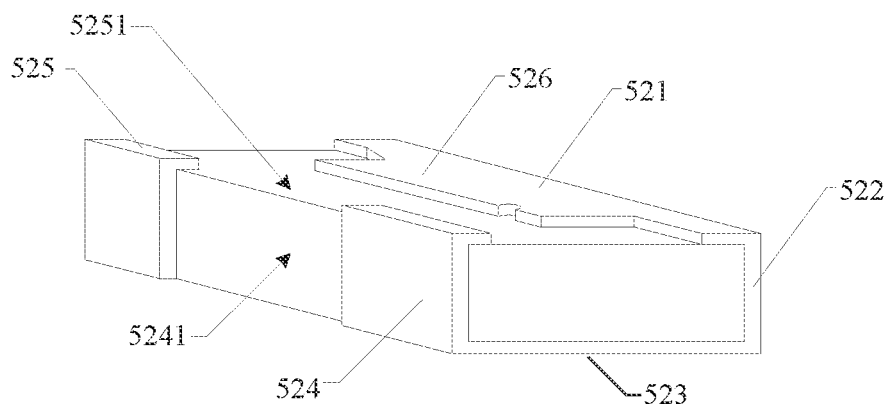
FIG. 18 is a schematic structural diagram of a battery in an electronic device according to some other embodiments of this application.

In order to prevent the part of the electrical connector 70 located on the first surface 51a and the wrapping film 52 from overlapping in the expanded region 51a2, in some other embodiments, referring to FIG. 18, FIG. 18 is a schematic structural diagram of a battery 50 in an electronic device 100 according to some other embodiments of this application. A difference between the structure of the wrapping film 52 in the embodiment shown in FIG. 18 and the structure of the wrapping film 52 shown in FIG. 8 to FIG. 9 is that a second notch 5251 is provided at a position of the fifth portion 525 corresponding to the electrical connector 70. Specifically, a part of the second notch 5251 is located in the expanded region 51a2, and an other part of the second notch is located in the second non-expanded region 51a12. The second notch 5251 is configured to give way to the third sub-portion 703 located in the expanded region 51a2 and the second sub-portion 702 located in the second non-expanded region 51a12. Therefore, the second notch 5251 extends to an edge of the fifth portion 525 in a direction from the fifth portion 525 to the fourth portion 524. In this way, the overall thickness of the battery 50 and the electrical connector 70 is not increased, thereby facilitating reduction in the thickness of the electronic device 100. In this way, thinning of the electronic device 100 can be achieved at least to a certain extent.

Specifically, in order to further save the material and improve the avoidance effect of the electrical connector 70, the fourth portion 524 has formed thereon a second communication notch 5241 extending through the fourth portion 524 in a thickness direction of the fourth portion 524. The second communication notch 5241 is in communication with the second notch 5251. The second communication notch 5241 may be configured to give way to the part of the electrical connector 70 on the side that the fourth portion 524 faces.

Figure 19:
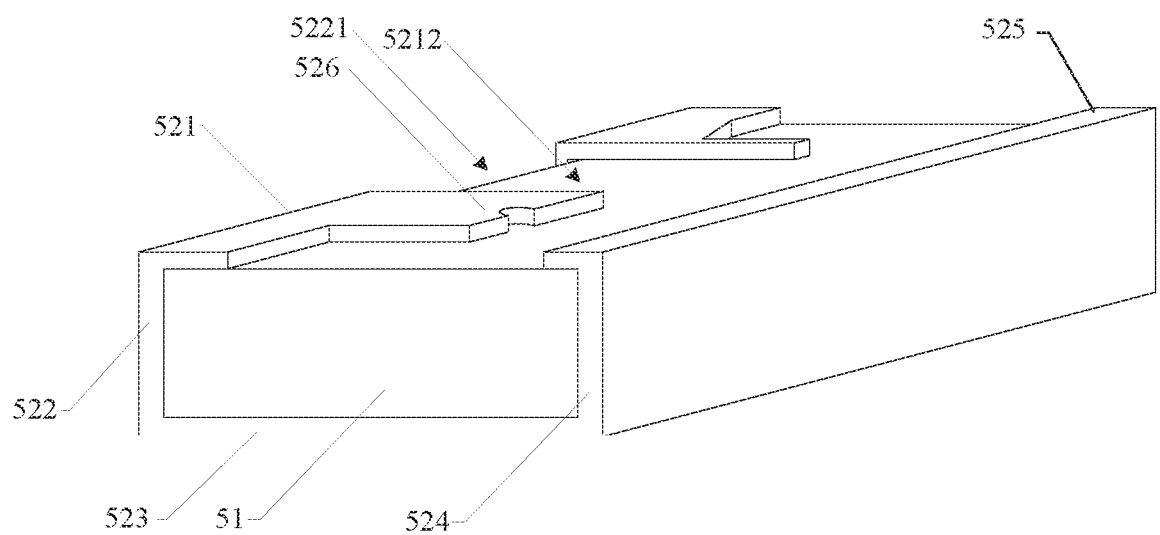
FIG. 19 is a schematic structural diagram of a battery in an electronic device according to some other embodiments of this application.

In order to prevent the part of the electrical connector 70 located on the first surface 51a and the wrapping film 52 from overlapping in the expanded region 51a2, in some other embodiments, referring to FIG. 19. FIG. 19 is a schematic structural diagram of a battery 50 in an electronic device 100 according to some other embodiments of this application. A difference between the structure of the wrapping film 52 in the embodiment shown in FIG. 19 and the structure of the wrapping film 52 shown in FIG. 12 to FIG. 15 is that a first notch 5212 is provided at a position of the first portion 521 corresponding to the electrical connector 70. Specifically, a part of the first notch 5212 is located in the expanded region 51a2, and an other part of the first notch is located in the third non-expanded region 51a13. The first notch 5212 is configured to give way to the third sub-portion 703 located in the expanded region 51a2 and the second sub-portion 702 located in the third non-expanded region 51a13. Therefore, the first notch 5212 extends to an edge of the first portion 521 in a direction from the first portion 521 to the second portion 522. In this way, the overall thickness of the battery 50 and the electrical connector 70 is not increased, thereby facilitating reduction in the thickness of the electronic device 100. In this way, thinning of the electronic device 100 can be achieved at least to a certain extent.

Specifically, in order to further save the material and improve the avoidance effect of the electrical connector 70, the second portion 522 has formed thereon a first communication notch 5221 extending through the second portion 522 in a thickness direction of the second portion 522. The first communication notch 5221 is in communication with the first notch 5212. The first communication notch 5221 may be configured to give way to a part of the electrical connector 70 on the side that the second portion 522 faces.

On the basis of any one of the above embodiments, the electronic device 100 may further include a separator (not shown in the figure). The separator is located between the first surface 51a and the surface of the housing 10 opposite to the first surface 51a, that is, the separator is located between the first surface 51a and the back housing 12. A giving-way notch is formed on the part of the wrapping film 52 wrapped around the first surface 51a, and the giving-way notch is configured to give way to the separator.

Optionally, at least part of the giving-way notch may be defined by at least one of the first notch 5212, the second notch 5251, or the avoidance notch 5261. For example, the first notch 5212 and the avoidance notch 5261 may define the giving-way notch. For another example, a part of the first notch 5212 and the entire avoidance notch 5261 define the giving-way notch. For another example, the second notch 5251 defines the giving-way notch. For another example, the second notch 5251 defines a part of the giving-way notch. Certainly, it may be understood that the giving-way notch may further be a notch formed on a part of the wrapping film 52 wrapped around the first surface 51a and independent of all of the first notch 5212, the second notch 5251, and the avoidance notch 5261.

For example, the separator may be a heat sink (for example, a graphite sheet). The heat sink can transfer the heat generated during operation of the battery 50 to the back cover 122, thereby improving the heat dissipation effect of the electronic device.

For another example, the separator may be mylar or foam, and the electrical connector 70 is attached to the housing by the separator, thereby improving the reliability of the connection between the electrical connector 70 and the housing 10, prolonging the service life of the electrical connector 70, and ensuring the operation reliability of the electronic device 100.

In the descriptions of this specification, the described specific features, structures, materials, or characteristics may be combined in a proper manner in any one or more of the embodiments or examples.

Finally, it should be noted that: the foregoing embodiments are merely used for describing the technical solutions of this application, but are not intended to limit this application. Although this application is described in detail with reference to the foregoing embodiments, it should be appreciated by a person skilled in the art that, modifications may still be made to the technical solutions described in the foregoing embodiments, or equivalent replacements may be made to the part of the technical features; without departing from the spirit and scope of the technical solutions of the embodiments of this application.

What is claimed is:

1. An electronic device, comprising:
   a housing having a battery compartment;
   a battery mounted in the battery compartment, wherein the battery comprises a battery body and a wrapping film wrapped around a surface of the battery body, wherein the battery body has a first surface, the first surface has an expanded region, a distance between an edge of the expanded region and a peripheral edge of the first surface is d, and d is greater than or equal to 0; and
   an electrical connector having at least part located on the first surface, wherein the part of the electrical connector does not overlap with the wrapping film in the expanded region.

2. The electronic device of claim 1, wherein a thickness of the battery body is h, and d and h satisfy: d=(0.5*h+a) mm, wherein a is in a range of [0, 10] mm.

3. The electronic device of claim 2, wherein a is in a range of (0, 3] mm.

4. The electronic device of claim 3, wherein a is in a range of (0, 2] mm.

5. The electronic device of claim 1, wherein the battery body has a second surface opposite to the first surface and two side surfaces connected between the first surface and the second surface and opposite to each other; and
   wherein the wrapping film comprises a first portion, a second portion, and a third portion connected in sequence, the first portion is wrapped around the first surface, the second portion is wrapped around one of the two side surfaces, and the third portion is wrapped around the second surface.

6. The electronic device of claim 5, wherein the wrapping film comprises a tearable portion connected to an end of the first portion away from the second portion, and the tearable portion comprises an avoidance notch configured to give way to the electrical connector.

7. The electronic device of claim 5, wherein a part of the first portion is wrapped in the expanded region, and a first notch is provided at a part of the first portion corresponding to the electrical connector.

8. The electronic device of claim 7, wherein the first notch extends to an edge of the first portion in a direction from the first portion to the second portion.

9. The electronic device of claim 8, wherein a first communication notch is formed on the second portion, and the first communication notch extends through the second portion in a thickness direction of the second portion and in communication with the first notch.

10. The electronic device of claim 5, wherein the wrapping film further comprises a fourth portion and a fifth portion, the fourth portion is connected to an end of the third portion away from the second portion, and the fifth portion is connected to an end of the fourth portion away from the third portion; and
    wherein the fourth portion is wrapped around the other of the two side surfaces, and the fifth portion is wrapped around the first surface.

11. The electronic device of claim 10, wherein a part of the fifth portion is wrapped in the expanded region, and a second notch is provided at the part of the fifth portion in the expanded region corresponding to the electrical connector.

12. The electronic device of claim 11, wherein the second notch extends to an edge of the fifth portion in a direction from the fifth portion to the fourth portion.

13. The electronic device of claim 12, wherein a second communication notch is formed on the fourth portion, and the second communication notch extends through the fourth portion in a thickness direction of the fourth portion and in communication with the second notch.

14. The electronic device of claim 5, wherein the battery body further comprises a first end surface connected between the two side surfaces and having an electrical connection terminal, wherein the first surface, the second surface, and the two side surfaces are arranged along a circumferential direction of the first end surface.

15. The electronic device of claim 1, further comprising a main circuit board and a side functional device; wherein the electrical connector is configured to connect the main circuit board to the side functional device.

16. The electronic device of claim 15, wherein the side functional device is at least one of a side button or a side fingerprint recognition module.

17. The electronic device of claim 1, further comprising a main circuit board and an auxiliary circuit board; wherein the electrical connector is configured to connect the main circuit board to the auxiliary circuit board.

18. The electronic device of claim 1, further comprising a main circuit board and a display; wherein the electrical connector bypasses the battery to connect the main circuit board to the display.

19. The electronic device of claim 1, wherein the electrical connector is a flexible printed circuit board.

20. The electronic device of claim 1, further comprising a separator; wherein the separator is located between the first surface and a surface of the housing opposite to the first surface, a giving-way notch is formed on the part of the wrapping film wrapped around the first surface, and the giving-way notch is configured to give way to the separator.

* * * * *

UNITED STATES PATENT AND TRADEMARK OFFICE
CERTIFICATE OF CORRECTION

| | | |
|---|---|---|
| PATENT NO. | : 12,452,353 B2 | Page 1 of 1 |
| APPLICATION NO. | : 17/911076 | |
| DATED | : October 21, 2025 | |
| INVENTOR(S) | : Ang Tian | |

It is certified that error appears in the above-identified patent and that said Letters Patent is hereby corrected as shown below:

On the Title Page

In Column 1 (item (71) Applicant), In Line 2, Delete "Guangdong" and insert -- Shenzhen --.

Signed and Sealed this
Sixth Day of January, 2026

John A. Squires
*Director of the United States Patent and Trademark Office*